US009594274B2

(12) United States Patent
Kobayashi

(10) Patent No.: US 9,594,274 B2
(45) Date of Patent: Mar. 14, 2017

(54) PROCESS FOR PRODUCING OPTICALLY ANISOTROPIC FILM COMPONENT

(71) Applicant: Sumitomo Chemical Company, Limited, Tokyo (JP)

(72) Inventor: Tadahiro Kobayashi, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 124 days.

(21) Appl. No.: 14/560,077

(22) Filed: Dec. 4, 2014

(65) Prior Publication Data

US 2015/0160392 A1    Jun. 11, 2015

(30) Foreign Application Priority Data

Dec. 5, 2013 (JP) .................. 2013-251759

(51) Int. Cl.
*B05D 5/06* (2006.01)
*G02F 1/13363* (2006.01)
*G02B 5/30* (2006.01)

(52) U.S. Cl.
CPC ....... *G02F 1/13363* (2013.01); *G02B 5/3033* (2013.01); *Y10T 428/1005* (2015.01); *Y10T 428/31507* (2015.04)

(58) Field of Classification Search
CPC .. G02B 5/3083; G02B 5/3033; G02B 5/3016; G02B 5/32; G02B 1/14; B05D 3/10; B05D 7/04; G02F 1/13363; G02F 1/133633; G02F 1/1337; G02F 1/133711; G02F 2001/133726; Y10T 428/10; Y10T 428/1005; Y10T 428/1036; B32B 38/164; B32B 2307/40

USPC .......... 428/1.1, 1.2, 1.3, 1.33; 427/162, 164, 427/553, 177, 359, 378, 372.2, 407.1; 264/1.34, 1.6

See application file for complete search history.

(56) References Cited

U.S. PATENT DOCUMENTS

| 5,780,629 A | 7/1998 | Etzbach et al. |
| 5,853,801 A * | 12/1998 | Suga ........................ B05D 3/12 427/164 |
| 6,217,792 B1 | 4/2001 | Parri et al. |

(Continued)

FOREIGN PATENT DOCUMENTS

| JP | 06-034976 A | 2/1994 |
| JP | 09-506088 A | 6/1997 |

(Continued)

OTHER PUBLICATIONS

Liquid Crystal Handbook, Chapter 3, Section 4-3, "Chiral agent for TN and STN," ed: Japan Society for the Promotion of Science, 142 committee, pp. 199-202, 210, 213 (1989).

(Continued)

*Primary Examiner* — Ruiyun Zhang
(74) *Attorney, Agent, or Firm* — Panitch Schwarze Belisario & Nadel LLP

(57) ABSTRACT

A process for producing an optically anisotropic film component having few defects is provided. The process includes forming a coating continuously on a surface of an elongated film roll, and the process further includes a step of changing the conveyance direction of the elongated film roll on which the coating has been formed while blowing air to a surface of the coating formed on the elongated film roll.

10 Claims, 3 Drawing Sheets

(56) References Cited

U.S. PATENT DOCUMENTS

| | | | |
|---|---|---|---|
| 6,723,395 B2 | 4/2004 | May et al. | |
| 8,383,212 B2 | 2/2013 | Obata et al. | |
| 2012/0148737 A1* | 6/2012 | Komatsubara | G02B 5/3083 |
| | | | 427/162 |

FOREIGN PATENT DOCUMENTS

| | | |
|---|---|---|
| JP | 2000-515496 A | 11/2000 |
| JP | 2003-137887 A | 5/2003 |
| JP | 2007-148098 A | 6/2007 |
| JP | 2007-169178 A | 7/2007 |
| JP | 2007-176870 A | 7/2007 |
| JP | 2007-269639 A | 10/2007 |
| JP | 2007-269640 A | 10/2007 |
| JP | 2009-157226 A | 7/2009 |
| JP | 2010-031223 A | 2/2010 |
| JP | 2010-270108 A | 12/2010 |
| JP | 2011-006360 A | 1/2011 |
| JP | 2011-207765 A | 10/2011 |
| JP | 2011-242743 A | 12/2011 |
| WO | 2013105317 A1 | 7/2013 |

OTHER PUBLICATIONS

Liquid Crystal Handbook, Chapter 3, Section 8-6, "Network (Complete cross-linked type)" and Chapter 6, Section 5-1 "Liquid crystal material b. Polymerizable nematic liquid crystal material," ed: editorial committee of Liquid Crystal Handbook, Maruzen Co., Ltd. (Oct. 3, 2000).

* cited by examiner

PROCESS FOR PRODUCING OPTICALLY ANISOTROPIC FILM COMPONENT

FIELD OF THE INVENTION

The present application claims the Paris Convention priority based on Japanese Patent Application No. 2013-251759 filed on Dec. 5, 2013, the entire content of which is incorporated herein by reference.

The present invention relates to a process for producing an optically anisotropic film component.

BACKGROUND OF THE INVENTION

An optically anisotropic film, such as a polarization plate, a retardation film or the like, is used in a flat panel display device (FPD). As the optically anisotropic film, an optically anisotropic film having an optically anisotropic film component is known which is produced by applying a composition comprising a liquid crystal compound onto an elongated film roll. For example, Patent Document 1 (JP 2007-148098 A) describes an optically anisotropic film having an optically anisotropic film component formed by applying a composition comprising a liquid crystal compound onto a substrate exposed to orientation treatment and polymerizing it.

Patent Document 1: JP 2007-148098 A

SUMMARY OF THE INVENTION

According to the conventional process for producing an optically anisotropic film component using an elongated film roll, a defect is generated in the optically anisotropic film component.

The present invention includes the following embodiments.

[1] A process for producing an optically anisotropic film component, the process comprising forming a coating continuously on a surface of an elongated film roll, wherein the process further comprises a step of changing the conveyance direction of the elongated film roll on which the coating has been formed while blowing air continuously to a surface of the coating formed on the elongated film roll.

[2] The process for producing an optically anisotropic film component according to [1], wherein the following steps (1) and (2) are carried out:

step (1) of applying a composition for an optically anisotropic film component onto the elongated film roll, and step (2) of forming the coating from the applied composition for an optically anisotropic film component.

[3] The process for producing an optically anisotropic film component according to [1], wherein the composition for an optically anisotropic film component is a composition for forming an orientation film, and the coating is an orientation film.

[4] The process for producing an optically anisotropic film component according to [1], wherein the composition for an optically anisotropic film component is a composition for forming an optically anisotropic layer, and the coating is an optically anisotropic layer.

[5] The process for producing an optically anisotropic film component according to [1], wherein the following steps (11) to (14) are carried out:

step (11) of applying a first composition for an optically anisotropic film component onto the elongated film roll, step (12) of forming a first coating from the applied first composition for an optically anisotropic film component, step (13) of applying a second composition for an optically anisotropic film component onto the first coating, and step (14) of forming a second coating from the applied second composition for an optically anisotropic film component.

[6] The process for producing an optically anisotropic film component according to [5], wherein the first composition for an optically anisotropic film component is a composition for forming an orientation film, the first coating is an orientation film, the second composition for an optically anisotropic film component is a composition for forming an optically anisotropic layer, and the second coating is an optically anisotropic layer.

[7] The process for producing an optically anisotropic film component according to [1], wherein air is blown with an air blow guiding member.

[8] The process for producing an optically anisotropic film component according to [1], wherein the elongated film roll is conveyed at a tension of 50 to 150 N/mm.

[9] An optically anisotropic film obtained by the process for producing an optically anisotropic film component according to [1].

[10] A liquid crystal display device comprising the optically anisotropic film according to [9].

According to the present invention, it is possible to provide a process for producing an optically anisotropic film component having few defects.

DETAILED DESCRIPTION OF EMBODIMENTS

Figure 1:
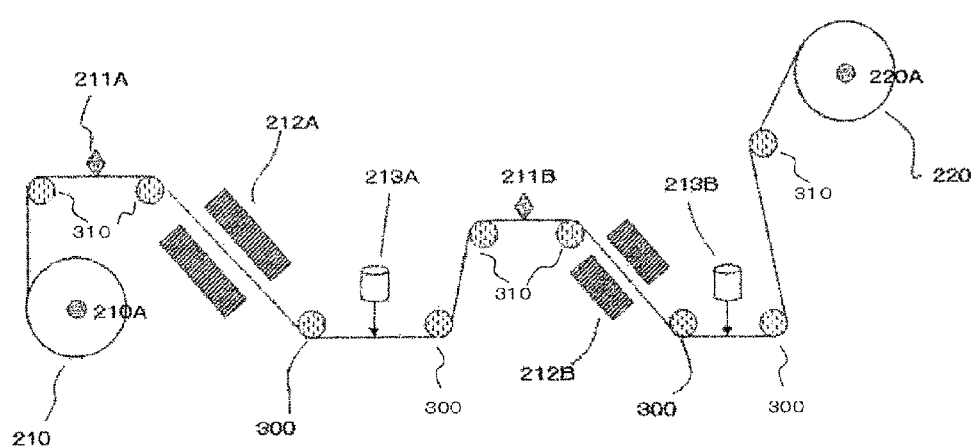
FIG. 1 is a diagram showing a main part of the continuous production process of an optically anisotropic film component.

The process for producing an optically anisotropic film component of the present invention (hereinafter, also referred to as "the present production process") is a process wherein a coating is continuously formed on a surface of an elongated film roll, wherein the process comprises a step of changing the conveyance direction of the elongated film roll on which the coating has been formed while blowing air continuously to a surface of the coating formed on the elongated film roll. Preferably, the process comprises a step of changing the conveyance direction of the elongated film roll on which the coating has been formed while the surface of the coating formed on the elongated film roll is brought into contact with nothing but air (gas). In the present specification, "long film roll" collectively refers to "roll-shaped long film" and "long film wound off from a roll-shaped long film".

The present production process generally comprises the following steps (1) and (2).

step (1) of applying a composition for an optically anisotropic film component onto the elongated film roll.

step (2) of forming the coating from the applied composition for an optically anisotropic film component.

The present production process preferably comprises the following steps (11) to (14).

step (11) of applying a first composition for an optically anisotropic film component onto the elongated film roll.

step (12) of forming a first coating from the applied first composition for an optically anisotropic film component.

step (13) of applying a second composition for an optically anisotropic film component onto the first coating.

step (14) of forming a second coating from the applied second composition for an optically anisotropic film component.

<Elongated Film Roll>

The elongated film roll is generally made of a resin.

The elongated film roll is preferably transparent. The transparent elongated film roll refers to an elongated film roll having translucency in which a light, in particular a visible light can be transmitted, and the translucency refers to a property in which a transmission of a light beam in a wavelength of 380 to 780 nm is 80% or higher.

Examples of a resin constituting the elongated film roll include polyolefins such as polyethylene, polypropylene, norbornene-based polymers; polyvinyl alcohol; polyethylene terephthalate; polymethacrylic acid esters; polyacrylic acid esters; cellulosic esters; polyethylene naphthalate; polycarbonates; polysulfones; polyethersulfones; polyetherketones; polyphenylene sulfide; and polyphenylene oxide. Among them, an elongated film roll comprising a polyolefin such as polyethylene, polypropylene or norbornene-based polymers is preferable.

Such an elongated film roll is available in the market.

A surface treatment may be performed on the elongated film roll. Examples of a method of the surface treatment include a method of treating an elongated film roll surface using corona or plasma under vacuum to atmosphere pressure; a laser treatment method of an elongated film roll surface; an ozone treatment method of an elongated film roll surface; a saponification treatment method of an elongated film roll surface; a flame treatment method of an elongated film roll surface; a method of applying a coupling agent onto an elongated film roll surface; a primer treatment method of an elongated film roll surface; and a treatment method of carrying out a graft polymerization by exposure of radiation, corona or plasma after applying a reactive monomer or polymer onto an elongated film roll surface. Among them, the method of treating an elongated film roll surface using corona or plasma under vacuum to atmosphere pressure is preferable.

Examples of the method of treating an elongated film roll surface using corona or plasma under vacuum to atmosphere pressure include a method of treating an elongated film roll surface by arranging the elongated film roll between electrodes facing with each other and generating corona or plasma under a pressure close to atmosphere pressure; a method of blowing a gas between electrodes facing with each other, making the gas into plasma between the electrodes and applying the plasma-state gas to an elongated film roll; and a method of treating an elongated film roll surface by generating glow discharge plasma under a low pressure condition.

Among them, preferable is a method of treating an elongated film roll surface by arranging the elongated film roll between electrodes facing with each other and generating corona or plasma under a pressure close to atmosphere pressure, or a method of blowing a gas between electrodes facing with each other, making the gas into plasma between the electrodes and applying the plasma-state gas to an elongated film roll. Such methods using corona or plasma are generally carried out by means of a commercially available surface treatment device.

The elongated film roll may also have a protective film on a surface reverse to the surface on which the coating has been formed. Examples of the protective film include a film such as polyethylene, polyethylene terephthalate, polycarbonate and polyolefins, and also a film additionally having an adhesion layer on the film. Among them, in view of a small thermal deformation in drying, polyethylene terephthalate is preferable. When the elongated film roll has a protective film on a surface reverse to the surface on which the coating film is formed, a shaking of the film and a slight vibration of the applied surface in conveying the elongated film roll can be suppressed, and uniformity of a coating can be improved.

The thickness of the elongated film roll is generally from 5 μm to 300 μm, and preferably from 20 μm to 200 μm.

The length of the elongated film roll in the longitudinal direction is generally from 10 m or longer, and preferably from 100 m to 3000 m. The length of the elongated film roll in the short direction is generally from 0.1 m to 5 m, and preferably from 0.2 m to 2 m.

<Coating, Composition for an Optically Anisotropic Film Component>

The composition for an optically anisotropic film component refers to a solution for forming a coating, and the composition preferably comprises a material for forming a coating and a solvent.

The coating in the present invention is formed by application on a long film which has been rolled, and examples thereof include an orientation film, an optically anisotropic layer, a protective layer and an adhesive agent layer. Among them, the orientation film or the optically anisotropic layer is preferable since these are obtained by applying the composition for an optically anisotropic film component on the film.

The first composition for an optically anisotropic film component is preferably a composition for forming an orientation film, and the first coating is preferably an orientation film, the second composition for an optically anisotropic film component is preferably a composition for forming an optically anisotropic layer, and the second coating is preferably an optically anisotropic layer.

<Orientation Film>

The orientation film is a film having an orientation controlling force which orients a liquid crystal compound described below in a desired direction.

The orientation film preferably has high solvent resistance in which the film is not dissolved by application of the composition for an optically anisotropic layer or the like, and has heat resistance in a heat treatment for removing solvents or for orienting a liquid crystal compound. Examples of the orientation film include an orientation film comprising an anisotropic polymer, photo-orientation film, and a groove orientation film having an unevenness pattern or multiple grooves on its surface.

Such an orientation film makes an orientation of a liquid crystal compound easy. In addition, it is possible to control different orientations such as horizontal orientation, vertical orientation, hybrid orientation, inclined orientation and the like by selecting a type of an orientation film and a rubbing condition.

The thickness of the orientation film is generally in a range of 10 nm to 10000 nm, preferably in a range of 10 nm to 1000 nm, more preferably 500 nm or less, and further preferably in a range of 10 nm to 200 nm.

The composition for forming an orientation film refers to a solution for forming an orientation film, and the composition preferably comprises a material for forming an orientation film and a solvent.

<Orientation Film Comprising Anisotropic Polymer>

Examples of the anisotropic polymer include polyamides and gelatins having amide bonds, polyimides having imide bonds and polyamic acids which are the hydrolysate thereof, polyvinyl alcohol, alkyl-modified polyvinyl alcohols, polyacrylamide, polyoxazoles, polyethylene imine, polystyrene, polyvinylpyrrolidone, polyacrylic acid, and polyacrylic acid esters. Among them, polyvinyl alcohol is preferable. It is also possible to combine two or more kinds of the anisotropic polymers.

The orientation film comprising an anisotropic polymer is generally obtained by applying an composition for forming an orientation film (hereinafter, also referred to as "anisotropic polymer composition"), in which an anisotropic polymer is dissolved in a solvent, onto an elongated film roll or a coating formed on an elongated film roll, and removing the solvent to form a coating, by applying the anisotropic polymer composition onto an elongated film roll or a coating formed on an elongated film roll, removing the solvent to form a coating and rubbing the coating.

Examples of the solvent include water; alcohol solvents such as methanol, ethanol, ethylene glycol, isopropyl alcohol, propylene glycol, methyl cellosolve, butyl cellosolve and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to combine two or more kinds of the solvents.

The concentration of the anisotropic polymer in the anisotropic polymer composition should be in such a range that the anisotropic polymer can completely dissolve in a solvent. The content of the anisotropic polymer is preferably from 0.1 to 20% by mass and more preferably from 0.1 to 10% by mass, relative to the anisotropic polymer composition.

The anisotropic polymer composition is available in the market. Examples of a commercially available product of the anisotropic polymer composition include SUNEVER® (manufactured by NISSAN CHEMICAL INDUSTRIES, LTD.) and OPTMER® (manufactured by JSR Corporation).

Examples of a method for applying the anisotropic polymer composition onto an elongated film roll or a coating formed on an elongated film roll include gravure coating method, die coating method applicator method and flexo method. Gravure coating method, die coating method and flexo method are preferable.

Examples of a method for removing the solvent contained in the anisotropic polymer composition include air drying, draught drying, heat drying, vacuum drying and the combination method thereof. The drying temperature is preferably from 10 to 250° C., and more preferably from 25 to 200° C. The drying time is, depending on a solvent type, preferably from 5 seconds to 60 minutes, and more preferably from 10 seconds to 30 minutes.

The coating formed of the anisotropic polymer composition may be exposed to a rubbing treatment. By the rubbing treatment, an orientation controlling force can be provided to the coating.

Examples of a rubbing treatment method include a method in which the coating is brought into contact with a rolling rubbing roll wrapped with a rubbing cloth.

In the rubbing treatment, it is also possible to form an orientation film having multiple areas (patterns) with different orientation directions by a masking treatment.

<Photo-Orientation Film>

The photo-orientation film can be generally obtained by applying the composition for forming an orientation film (hereinafter, also referred to as "composition for forming a photo-orientation film") onto an elongated film roll or a coating formed on an elongated film roll, and radiating a polarization light, preferably polarized UV, wherein the composition comprises a polymer or a monomer having a photoreactive group and a solvent. It is possible to arbitrarily control the direction of the orientation controlling force of the photo-orientation film by selecting a polarization direction of the radiated polarization light.

The photoreactive group refers to a group which generates an orientating force by light irradiation. Specific examples thereof include a group involved in a photoreaction as a source of the orientating force such as orientation-induced reaction, isomerization reaction, photodimerization reaction, photocrosslinkinq reaction or photodegradation reaction. The photoreactive group is preferably a group having a saturated group, in particular a double bond, and particularly preferably a group having at least one selected from the group consisting of a carbon-carbon double bond (C═C bond), a carbon-nitrogen double bond (C═N bond), a nitrogen-nitrogen double bond (N═N bond) and a carbon-oxygen double bond (C═O bond).

Examples of the photoreactive group having a C═C bond include a vinyl group, a polyene group, a stilbene group, a stilbazole group, a stilbazolium group, a chalcone group and a cinnamoyl group. Examples of the photoreactive group having a C═N group include a group having a structure of a Schiff base, an aromatic hydrazone or the like. Examples of the photoreactive group having a N═N bond include an azobenzene group, an azonaphthalene group, an aromatic heterocyclic azo group, an azobis group, formazan group and a group having an azoxybenzene structure. Examples of the photoreactive group having a C═O bond include a benzophenone group, a coumalin group, an anthraquinone group and a maleimide group. These groups may also have a substituent group such as an alkyl group, an alkoxy group, an aryl group, an allyloxy group, a cyano group, an alkoxycarbonyl group, a hydroxyl group, a sulfonate group or a halogenated alkyl group.

As the photoreactive group, a group involved in photodimerization reaction or photocrosslinking reaction is preferable in view of its superior orientation. Among them, a group involved in photodimerization reaction is preferable, and in view that a radiating amount of a polarization light required for orientation is relatively low and that a photo-orientation film having thermal and temporal stabilities is easily obtained, a cinnamoyl group and a chalcone group are preferable. The polymer having a photoreative group particularly preferably has a cinnamoyl group such that a terminal part of a side chain of the polymer has a cinnamic acid structure.

By applying the composition for forming a photo-orientation film onto an elongated film roll or a coating formed on an elongated film roll, it is possible to form an optical orientation-induced layer on the elongated film roll. Examples of a solvent contained in the composition include the same solvents as those contained in the above anisotropic polymer composition, and the solvent can be selected depending on a solubility of the polymer or monomer having a photoreactive group.

The amount of the polymer or monomer having a photoreactive group in the composition for forming a photo-orientation film can be adjusted depending on the type of the polymer or monomer and the targeted thickness of the photo-orientation film The amount is preferably at least 0.2% by mass, and more preferably in a range of 0.3 to 10% by mass. Unless the performance of the photo-orientation film is remarkably impaired, the composition for forming a photo-orientation film may also comprise a polymer material such as polyvinyl alcohol or a polyimide and a photosensitizer.

Examples of a method for applying the composition for forming a photo-orientation film onto an elongated film roll or a coating formed on an elongated film roll include the same methods as the methods for applying the anisotropic polymer composition onto an elongated film roll. Examples of a method for removing a solvent from the applied composition for forming a photo-orientation film include the same methods as the methods for removing a solvent from the anisotropic polymer composition.

In radiating a polarization light, it is possible either to radiate the polarization light directly to the composition for forming a photo-orientation film, which is applied on an elongated film roll or a coating formed on an elongated film roll, after a solvent is removed, or to radiate a polarization light through an elongated film roll by radiating the polarization light from a side of the elongated film roll. The polarization light is preferably a substantially parallel light. The wavelength of the radiated light is preferably in such a wavelength range that the polymer or monomer having a photoreactive group may incorporate optical energy. Specially, UV (ultraviolet light) in a wavelength range of 250 to 400 nm is particularly preferable. Examples of a light source for radiating the polarization light include a xenon lamp, a high-pressure mercury lamp, an extra high-pressure mercury lamp, a metal halide lamp, ultraviolet laser such as KrF and ArF, and the like. Among them, a high-pressure mercury lamp, an extra high-pressure mercury lamp and a metal halide lamp are preferable, since an emission intensity of an ultraviolet light at a wavelength of 313 nm is high. A polarized UV can be radiated by radiating a light from the light source through a suitable polarization layer. Examples of the polarization layer include a polarization prism such as a polarized filter, a Glan-Thomson and a Glan-Taylor, and also a wire grid-type polarizer.

In radiating the polarization light, it is also possible to form an orientation film having multiple areas (patterns) with different orientation directions by a masking treatment.

<Groove Orientation Film>

A groove orientation film is a film having an unevenness pattern or multiple grooves on its surface. When a liquid crystal compound is arranged on a film having multiple liner grooves at equal intervals, the liquid crystal compound is oriented in the direction along the grooves.

Examples of a method for obtaining the groove orientation film include a method in which after exposure on a surface of a photoreactive polyimide film through an exposure mask having a slit in a pattern form, development and rinsing treatments are carried out to form an evenness pattern; a method in which a UV-curable resin layer before cured is formed on a plate-shaped base board having grooves on its surface, and the resin layer is transmitted onto an elongated film roll or a coating formed on an elongated film roll and then cured; a method in which a layer of a UV-curable resin before cured, which is formed on an elongated film roll or a coating formed on an elongated film roll, is pressed onto a roll-shaped base board having multiple grooves to form unevenness and then cured; and the like. Specific examples of the methods include the methods described in JP 06-34976 A, JP 2011-242743 A and the like.

Among the above-mentioned methods, preferable is a method in which a layer of a UV-curable resin before cured, which has been formed on an elongated film roll or a coating formed on an elongated film roll, is pressed onto a roll-shaped base board having multiple grooves to form unevenness and then cured. The roll-shaped base board preferably a stainless (SUS) steel, in view of durability.

Examples of the UV-curable resin include a monofunctional acrylate, a polyfunctional acrylate and the mixture thereof.

The monofunctional acrylate is a compound having one group selected from the group consisting of an acryloyloxy group ($CH_2$=CH—COO—) and a methacryloyloxy group ($CH_2$=C($CH_3$)—COO—) (hereinafter, also referred to as "(meth)acryloyloxy group"). "(Meth)acrylate" means acrylate or methacrylate.

Examples of the monofunctional acrylate having one (meth)acryloyloxy group include an alkyl(meth)acrylate having 4 to 16 carbon atoms, a β-carboxyalkyl(meth)acrylate having 2 to 14 carbon atoms, an alkylated phenyl(meth)acrylate having 2 to 14 carbon atoms, methoxypolyethylene glycol (meth)acrylate, phenoxypolyethylene glycol (meth)acrylate and isobonyl(meth)acrylate.

The polyfunctional acrylate is a compound having two or more of (meth)acryloyloxy groups, and preferably a compound having 2 to 6 of (meth)acryloyloxy groups.

Examples the difunctional acrylate having two (meth) acryloyloxy groups include 1,3-butanediol di(meth)acrylate; 1,6-hexanediol di(meth)acrylate; ethylene glycol di(meth)acrylate; diethylene glycol di(meth)acrylate; neopentyl glycol di(meth)acrylate; triethylene glycol di(meth)acrylate; tetraethylene glycol di(meth)acrylate; polyethylene glycol diacrylate; bis(acryloyloxyethyl)ether of bisphenol A; ethoxylated bisphenol A di(meth)acrylate; propoxylated neopentyl glycol di(meth)acrylate; ethoxylated neopentyl glycol di(meth)acrylate, 3-methylpentanediol di(meth)acrylate.

Examples of the polyfunctional acrylate having 3 to 6 of (meth)acryloyloxy groups include trimehthylolpropane tri(meth)acrylate; pentaerythritol tri(meth)acrylate; tris(2-hydroxyethyl)isocyanurate tri(meth)acrylate; ethoxylated trimethylolpropane tri(meth)acrylate; propoxylated trimethylolpropane tri(meth)acrylate; pentaerythritol tetra (meth)acrylate; dipentaerythritol penta(meth)acrylate; dipentaerythritol hexa(meth)acrylate; tripentaerythritol tetra (meth)acrylate; tripentaerythritol penta(meth)acrylate; tripentaerythritol hexa(meth)acrylate; tripentaerythritol hepta (meth)acrylate; tripentaerythritol octa(meth)acrylate; a reaction product of pentaerythritol tri(meth)acrylate with an acid anhydride; a reaction product of dipentaerythritol penta (meth)acrylate with an acid anhydride; a reaction product of tripentaerythritol hepta(meth)acrylate with an acid anhydride; caprolactone-modified trimethylolpropane tri(meth)acrylate; caprolactone-modified pentaerythritol tri(meth)acrylate; caprolactone-modified tris(2-hydroxyethyl) isocyanurate tri(meth)acrylate; caprolactone-modified pentaerythritol tetra(meth)acrylate; caprolactone-modified dipentaerythritol penta(meth)acrylate; caprolactone-modified dipentaerythritol hexa(meth)acrylate; caprolactone-modified tripentaerythritol tetra(meth)acrylate; caprolactone-modified tripentaerythritol penta(meth)acrylate; caprolactone-modified tripentaerythritol hexa(meth)acrylate; caprolactone-modified tripentaerythritol hepta(meth) acrylate; caprolactone-modified tripentaerythritol octa(meth)acrylate; a reaction product of caprolactone-modified pentaerythritol tri(meth)acrylate with an acid anhydride; a reaction product of caprolactone-modified dipentaerythritol penta(meth)acrylate with an acid anhydride; and a reaction product of caprolactone-modified tripentaerythritol hepta (meth)acrylate with an acid anhydride.

The "caprolactone-modified" refers to that a ring-opened body or a ring-opened polymer of caprolactone is introduced between an alcohol-derived moiety and (meth)acryloyloxy group of a (meth)acrylate compound.

The polyfunctional acrylate is available in the market. Examples of the commercially available thereof include A-DOD-N, A-HD-N, AM-NOD-N, APG-100, APG-200, APG-400, A-GLY-9E, A-GLY-20E, A-TMN-3, A-TMPT, AD-TMP, ATM-35E, A-TMMT, A-9550, A-DPH, HD-N, NOD-N, NPG and TMPT (manufactured by Shin-Nakamura Chemical Co., Ltd.); ARONIX M-220, M-325, M-240, M-270, M-309, M-310, M-321, M-350, M-360, M-305, M-306, M-450, M-451, M-408, M-400, M-402, M-403, M-404, M-405 and M-406 (manufactured by Toagosei Co., Ltd.); EBECRYL 11, 145, 150, 40, 140 and 180, DPGDA, HDDA, TPGDA, HPNDA, PETIA, PETRA, TMPTA, TMPEOTA, DPHA and EBECRYL series (manufactured by Daicel-Cytec).

In order to obtain an orientation with little orientation disturbance, the width of the protrusion of the groove orientation film is preferably from 0.05 μm to 5 μm, the width of the recess is preferably from 0.1 μm to 5 μm, and the gap depth of the evenness is preferably 2 μm or less and more preferably from 0.01 μm to 1 μm.

<Optically Anisotropic Layer>

The optically anisotropic layer is generally formed from a composition for forming an optically anisotropic layer comprising a liquid crystal compound and a solvent.

<Liquid Crystal Compound>

Examples of the liquid crystal compound include a compound having a group represented by formula (X) (hereinafter, also referred to as "compound (X)"):

$$P^{11}-B^{11}-E^{11}-B^{12}-A^{11}-B^{13}- \quad (X)$$

wherein $P^{11}$ represents a hydrogen atom or a polymerizable group, $A^{11}$ represents a divalent alicyclic hydrocarbon group or a divalent aromatic hydrocarbon group, wherein a hydrogen atom of the divalent alicyclic hydrocarbon group and of the divalent aromatic hydrocarbon group may be substituted with a halogen atom, an alkyl group having 1 to 6 carbon atoms, an alkoxy group having 1 to 6 carbon atoms, a cyano group or a nitro group, and wherein a hydrogen atom of the alkyl group having 1 to 6 carbon atoms and of the alkoxy group having 1 to 6 carbon atoms may be substituted with a fluorine atom, $B^{11}$ represents —O—, —S—, —CO—O—, —O—CO—, —O—CO—O—, —CO—NR$^{16}$—, —NR$^{16}$—CO—, —CO—, —CO—, —CS— or a single bond, wherein R$^{16}$ represents a hydrogen atom or an alkyl group having 1 to 6 carbon atoms, $B^{12}$ and $B^{13}$ each independently represent —C≡C—, —CH=CH—, —CH$_2$—CH$_2$—, —O—, —S—, —C(=O)—, —C(=O)—O—, —O—C(=O)—, —O—C(=O)—O—, —CH=N—, —N=CH—, —N=N—, —C(=O)—NR$^{16}$—, —NR$^{16}$—C(=O)—, —OCH$_2$—, —OCF$_2$—, —CH$_2$O—, —CF$_2$O—, —CH=CH—C(=O)—O—, —O—C(=O)—CH=CH— or a single bond, and $E^{11}$ represents an alkanediyl group having 1 to 12 carbon atoms, wherein a hydrogen atom contained in the alkanediyl group may be also substituted with an alkoxy group having 1 to 5 carbon atoms, a hydrogen atom of the alkoxy group may be also substituted with a halogen atom, and —CH$_2$— constituting the alkanediyl group may be also substituted with —O— or —CO—. It is also possible to use the liquid crystal compound alone, or to combine multiple compounds having different structures.

The carbon number of the divalent alicyclic hydrocarbon group and divalent aromatic hydrocarbon group represented by $A^{11}$ is preferably in a range of 3 to 18, more preferably in a range of 5 to 12, and particularly preferably 5 or 6. $A^{11}$ is preferably cyclohexane-1,4-diyl group or 1,4-phenylene group.

The alkanediyl group having 1 to 12 carbon atoms represented by $E^{11}$ is preferably a liner alkanediyl group having 1 to 12 carbon atoms, wherein —CH$_2$— constituting the alkanediyl group having 1 to 12 carbon atoms may be also substituted with —O—.

Specific examples thereof include liner alkanediyl groups having 1 to 12 carbon atoms such as methylene group, ethylene group, propane-1,3-diyl group, butane-1,4-diyl group, pentane-1,5-diyl group, hexane-1,6-diyl group, heptane-1,7-diyl group, octane-1,8-diyl group, nonane-1,9-diyl group, decane-1,10-diyl group, undecane-1,11-diyl group and dodecane-1,12-diyl group; —CH$_2$—CH$_2$—O—CH$_2$—CH$_2$—, —CH$_2$—CH$_2$—O—CH$_2$—CH$_2$—O—CH$_2$—CH$_2$—, and —CH$_2$—CH$_2$—O—CH$_2$—CH$_2$—O—CH$_2$—CH$_2$—O—CH$_2$—CH$_2$—.

$B^{11}$ is preferably —O—, —S—, —CO—O— or —O—CO—, and among them, —CO—O— is more preferable.

$B^{12}$ and $B^{13}$ are preferably, each independently, —O—, —S—, —C(=O)—, —C(=O)—O—, —O—C(=O)— or —O—C(=O)—O—, and among them, —O— or —O—C(=O)—O— is more preferable.

$P^{11}$ is preferably a polymerizable group. In view that a photopolymerization reaction tends to take place, a radically polymerizable group or a cationically polymerizable group is preferable, and in view of an easy handling and an easiness to produce a liquid crystal compound, the polymerizable group is preferably a stilbene group or a group represented by the following formulae (P-11) to (P-15)

(P-11)

(P-12)

(P-13)

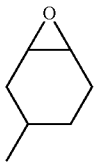
(P-14)

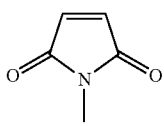
(P-15)

wherein

R$^{17}$ to R$^{21}$ each independently represent an alkyl group having 1 to 6 carbon atoms or a hydrogen atom.

Specific examples of the group represented by formulae (P-11) to (P-13) include a p-stilbene group and groups represented by the following formulae (P-16) to (P-20).

(P-16)

(P-17)

(P-18)

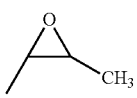
(P-19)

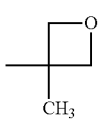
(P-20)

P$^{11}$ is preferably a group represented by formulae (P-14) to (P-20), and more preferably a vinyl group, an epoxy group or an oxetanyl group.

The group represented by P$^{11}$—B$^{11}$— is further preferably an acryloyloxy group or a methacryloyloxy group.

Examples of compound (X) include a compound represented by formulae (I), (II), (III), (IV), (V) and (VI):

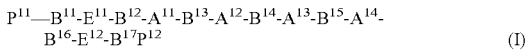
(I)

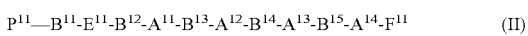
(II)

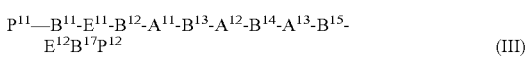
(III)

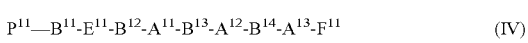
(IV)

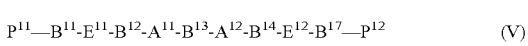
(V)

(VI)

wherein

A$^{12}$ to A$^{14}$ each independently are defined in the same manner as A$^{11}$, B$^{14}$ to B$^{16}$ each independently are defined in the same manner as B$^{12}$, is defined in the same manner as B$^{11}$, and E$^{12}$ is defined in the same manner as E$^{11}$, F$^{11}$ represents a hydrogen atom, an alkyl group having 1 to 13 carbon atoms, an alkoxy group having 1 to 13 carbon atoms, a cyano group, a nitro group, a trifluoromethyl group, a dimethylamino group, a hydroxy group, a methylol group, a formyl group, a sulfo group (—SO$_3$H), a carboxy group, an alkoxycarbonyl group having 1 to 10 carbon atoms or a halogen atom, wherein —CH$_2$— constituting the alkyl group and alkoxy group may be also substituted with —O—, and P$^{12}$ represents a hydrogen atom or a polymerizable group, and preferably a polymerizable group, and examples thereof include the polymerizable groups described above for P$^{11}$, and at least one of P$^{11}$ and P$^{12}$ is a polymerizable group.

Specific examples of the liquid crystal compound include liquid compounds described in "3.8.6 Network (Complete crosslink type)" and "6.5.1 Liquid crystal material b. Polymerizable nematic liquid crystal material" in "Liquid crystal handbook" (edited by editorial committee of Liquid crystal handbook, Maruzen Co., Ltd., Oct. 30, 2000), JP 2010-31223 A, JP 2010-270108 A, JP 2011-6360 A and JP 2011-207765 A.

The liquid crystal compound preferably has polymerizable group. Examples of the polymerizable group include the above-mentioned polymerizable group represented by P$^{11}$.

Specific examples of compound (X) include compounds represented by the following formulae (I-1) to (I-4), formulae (II-1) to (II-4), formulae (III-1) to (III-26), formulae (IV-1) to (IV-26), formulae (V-1) to (V-2) and formulae (VI-1) to (VI-6). In the following formulae, k1 and k2 each independently represent an integer from 2 to 12. In view of easy synthesis and availability, preferable are compounds (X) represented by formulae (I-1) to (I-4), formulae (II-1) to (II-4), formulae (III-1) to (III-26), formulae (IV-1) to (IV-26), formulae (V-1) to (V-2) and formulae (VI-1) to (VI-6).

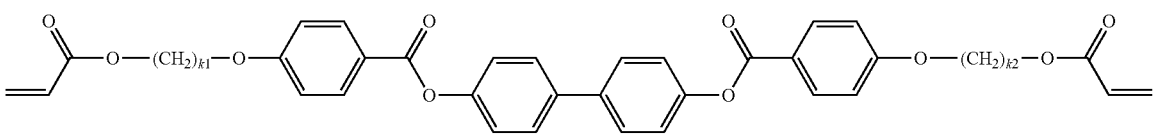
(I-1)

-continued
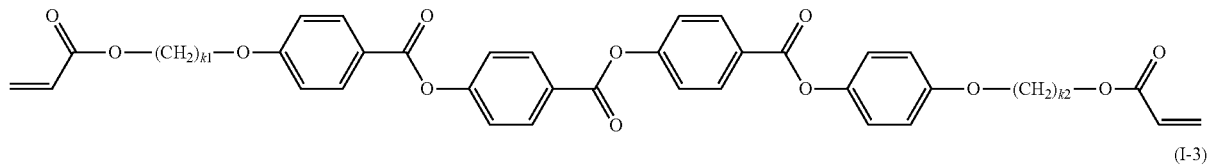
(I-2)
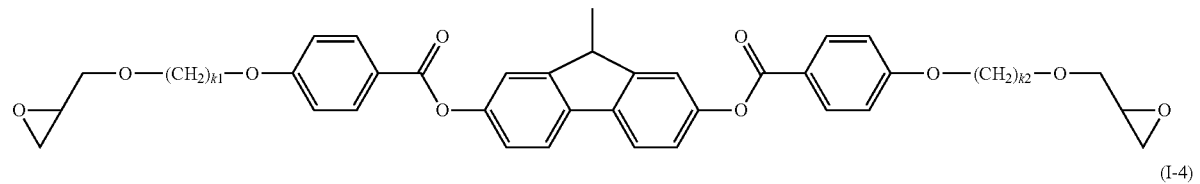
(I-3)
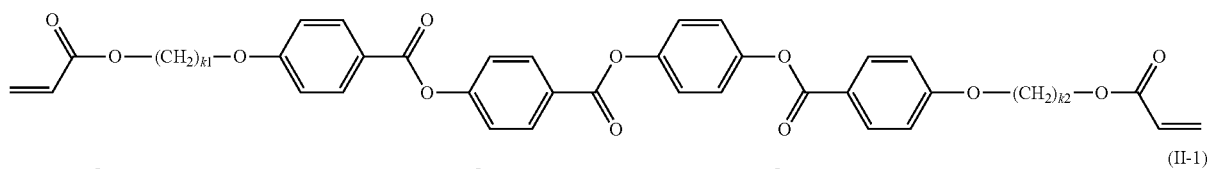
(I-4)
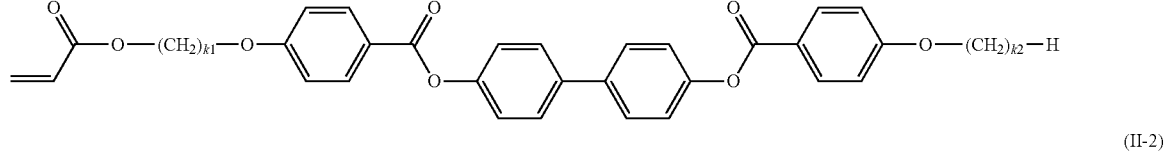
(II-1)
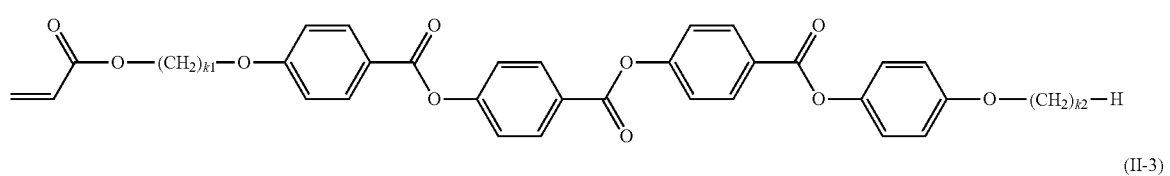
(II-2)
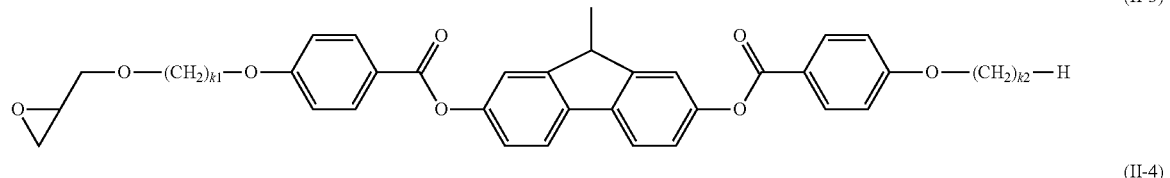
(II-3)
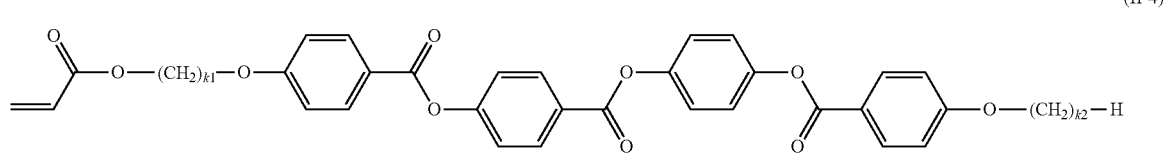
(II-4)
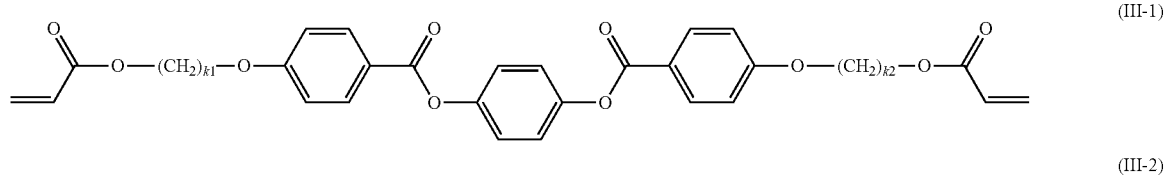
(III-1)
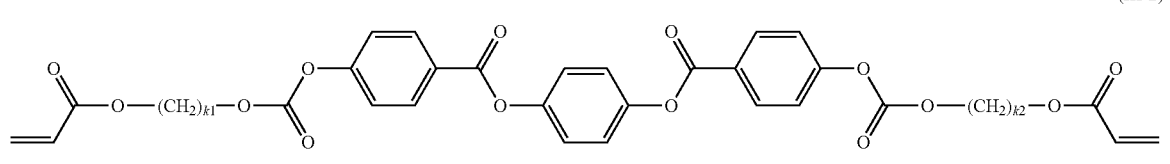
(III-2)
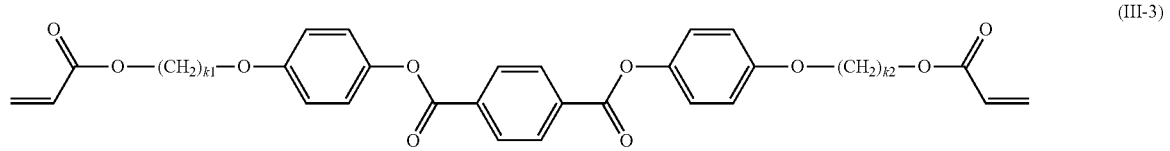
(III-3)

-continued
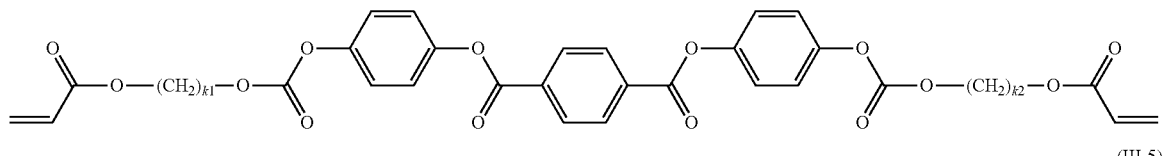
(III-4)
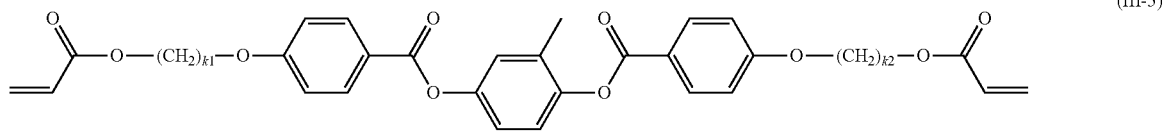
(III-5)
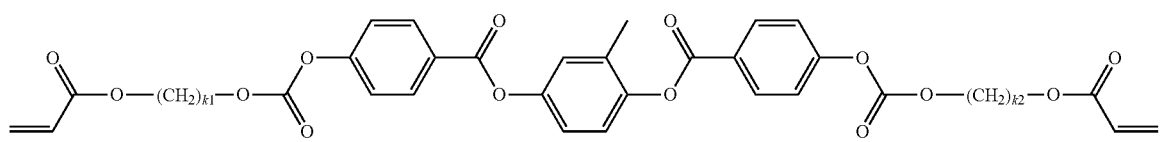
(III-6)
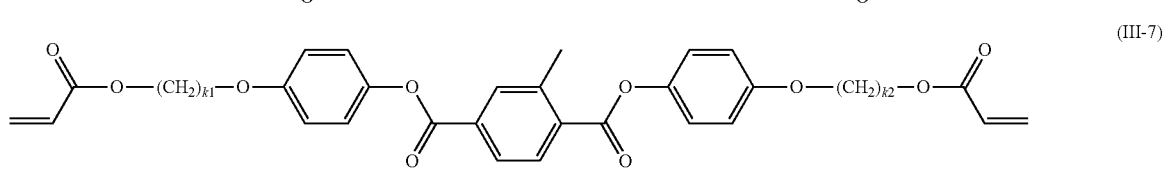
(III-7)
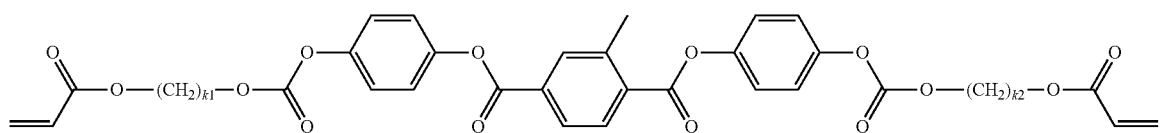
(III-8)
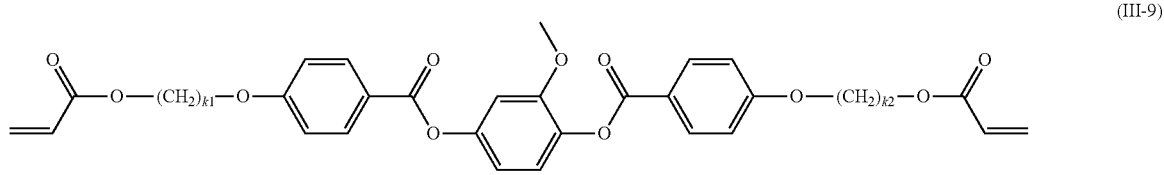
(III-9)
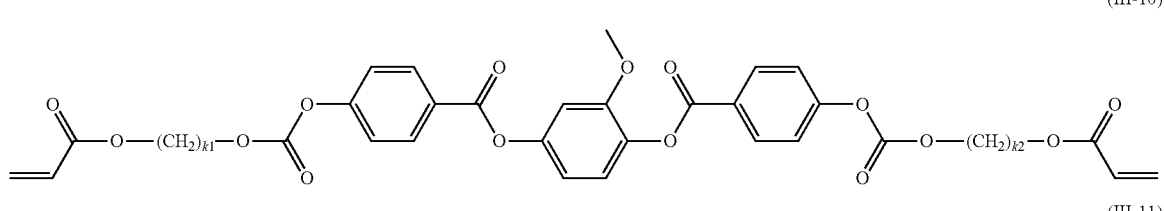
(III-10)
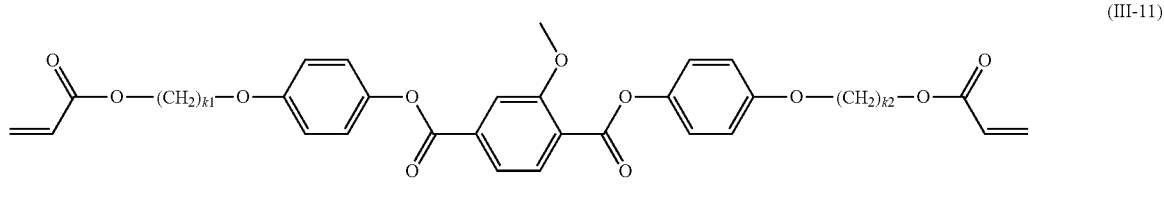
(III-11)
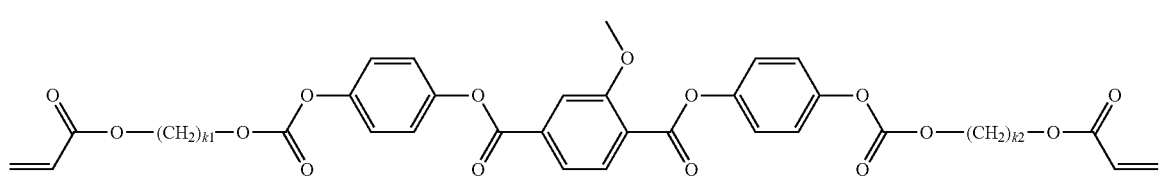
(III-12)

-continued
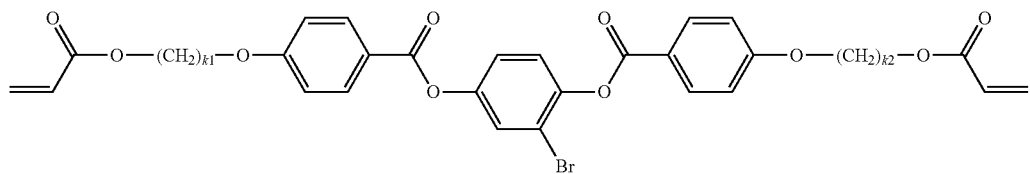
(III-13)
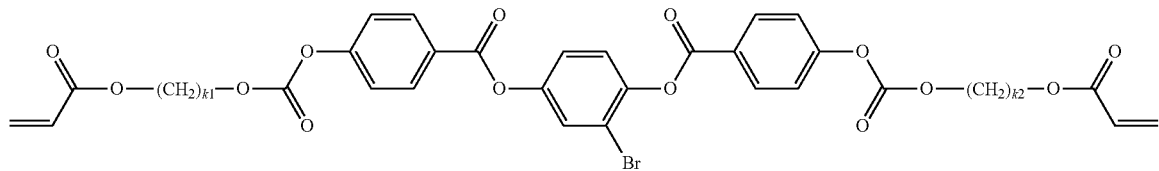
(III-14)
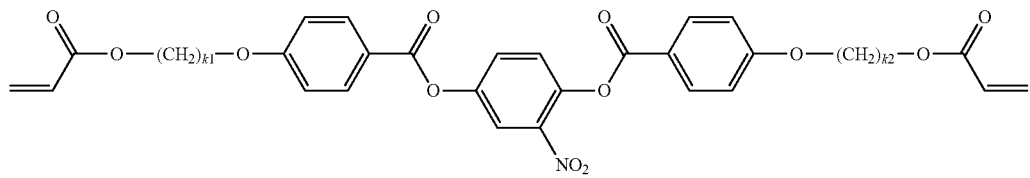
(III-15)
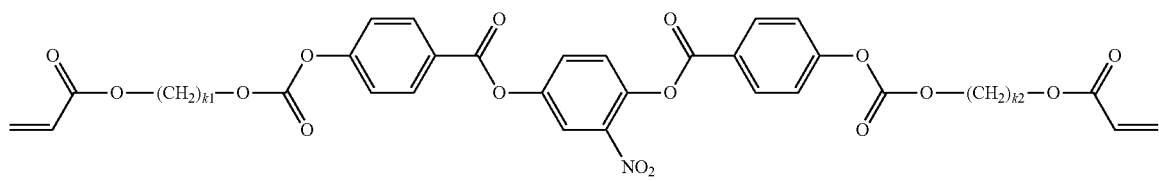
(III-16)
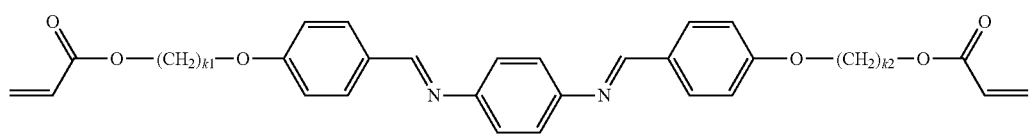
(III-17)
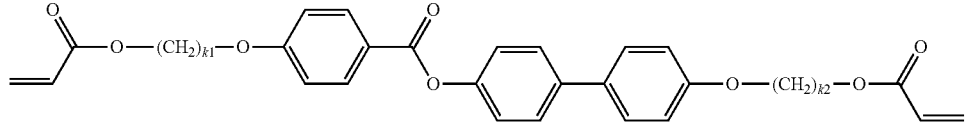
(III-18)
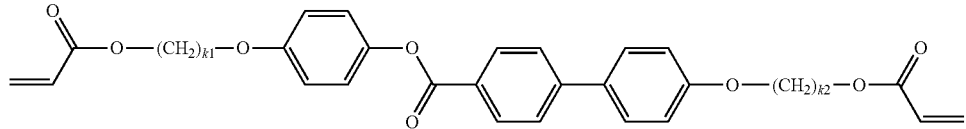
(III-19)
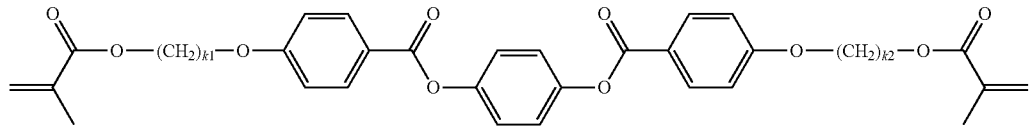
(III-20)
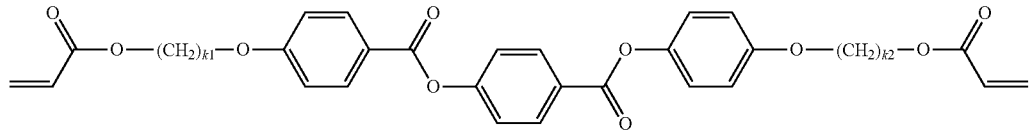
(III-21)
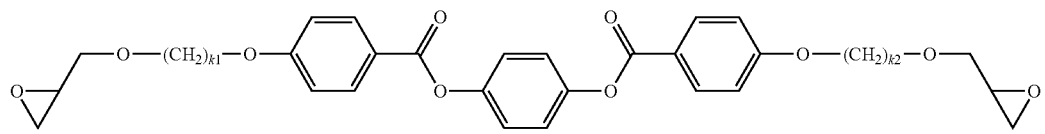
(III-22)

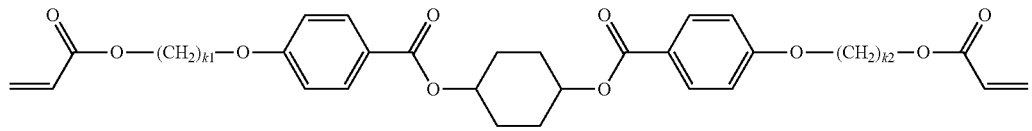
(III-23)
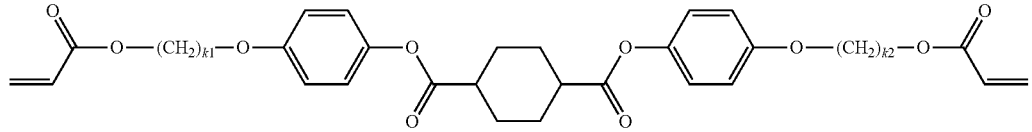
(III-24)
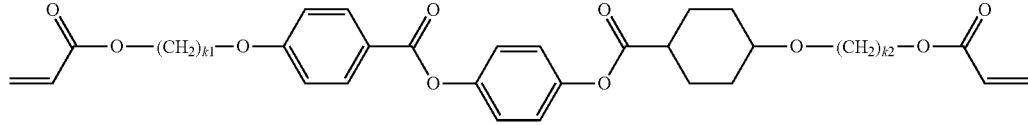
(III-25)
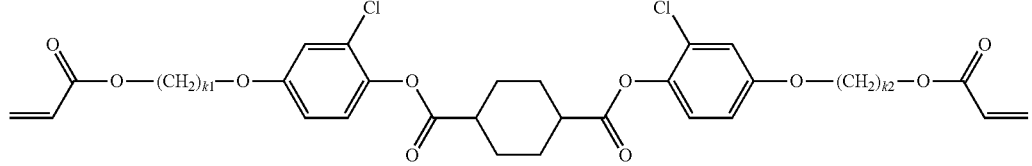
(III-26)
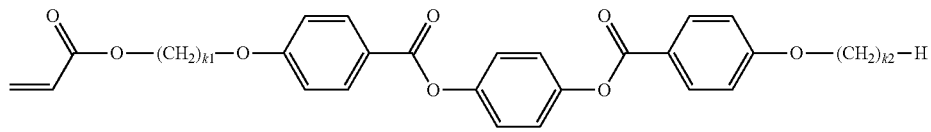
(IV-1)
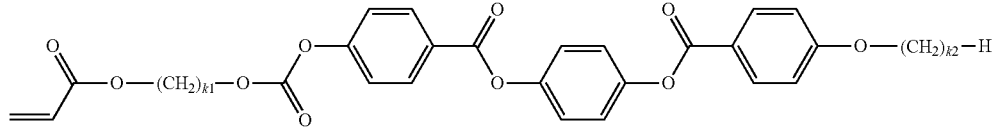
(IV-2)
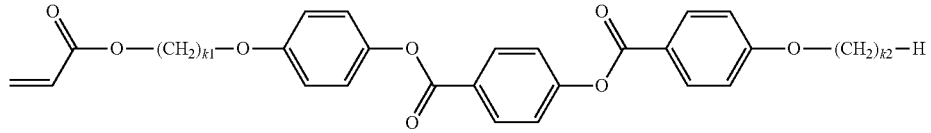
(IV-3)
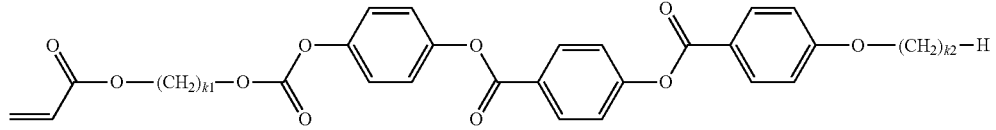
(IV-4)
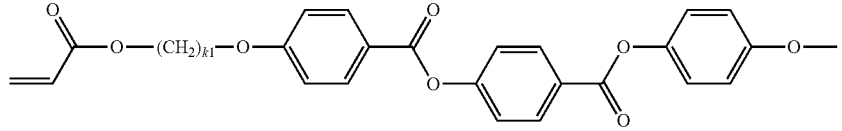
(IV-5)
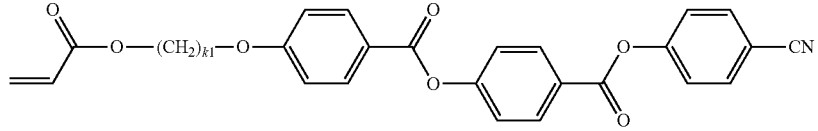
(IV-6)
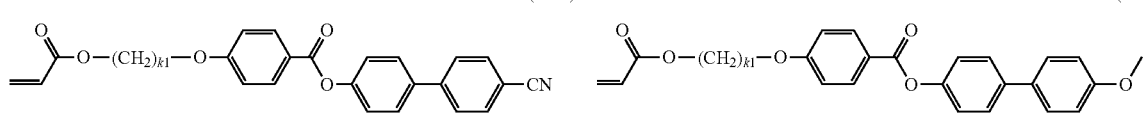
(IV-7) (IV-8)

(IV-9)
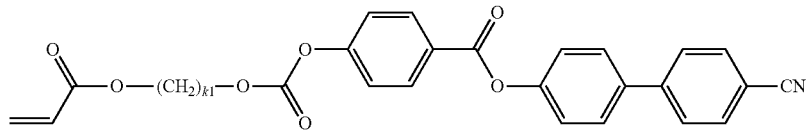
(IV-10)
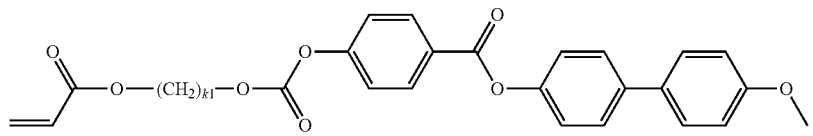
(IV-11) (IV-12)
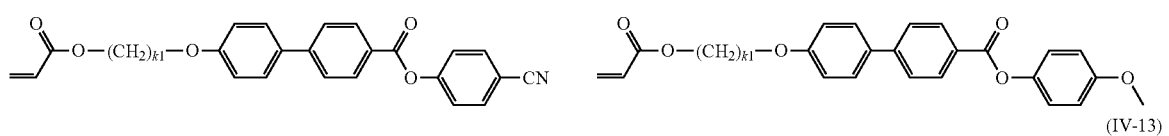
(IV-13)
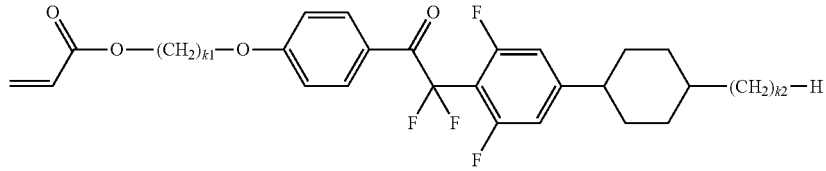
(IV-14)
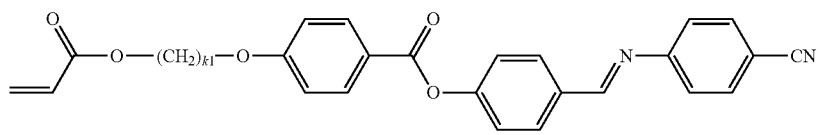
(IV-15)
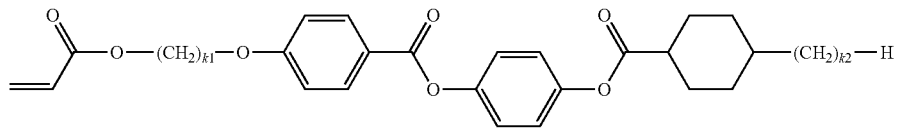
(IV-16)
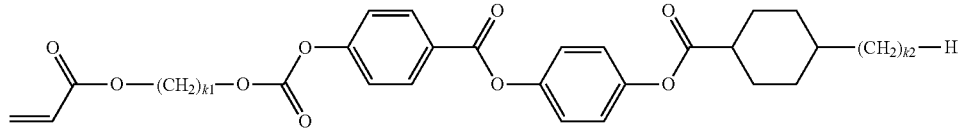
(IV-17)
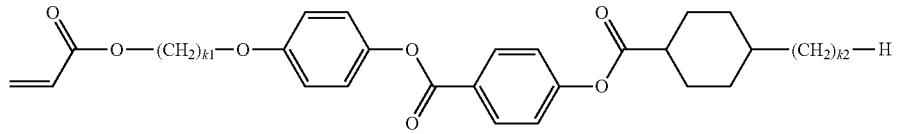
(IV-18)
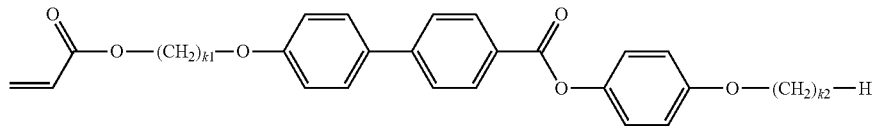
(IV-19)
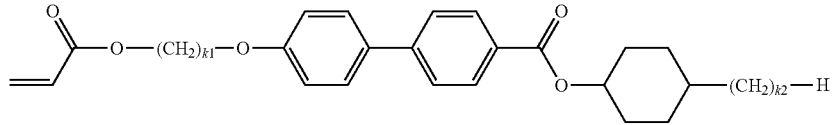
(IV-20)
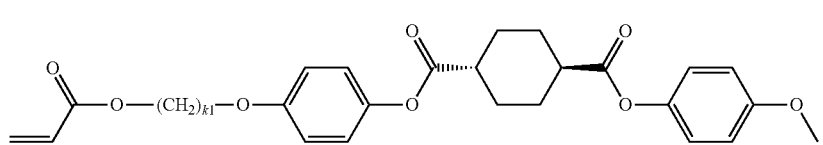

-continued
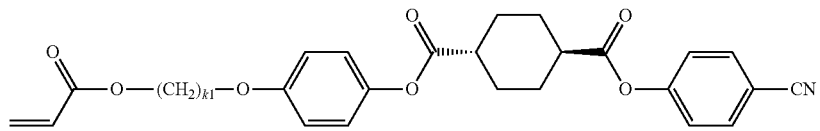
(IV-21)
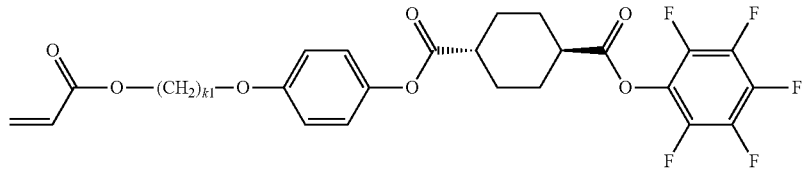
(IV-22)
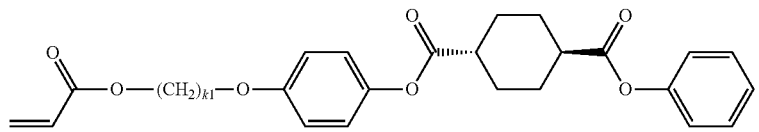
(IV-23)
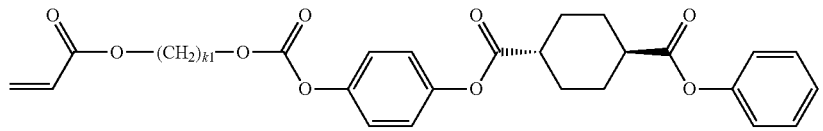
(IV-24)
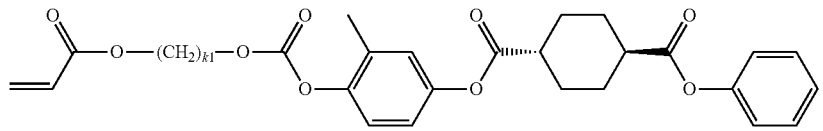
(IV-25)
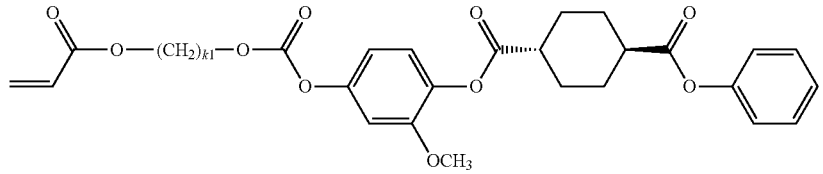
(IV-26)
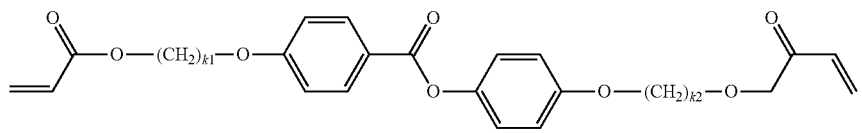
(V-1)
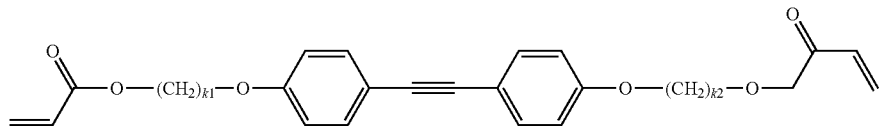
(V-2)
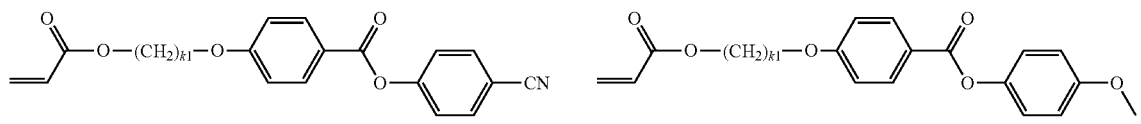
(VI-1) (VI-2)
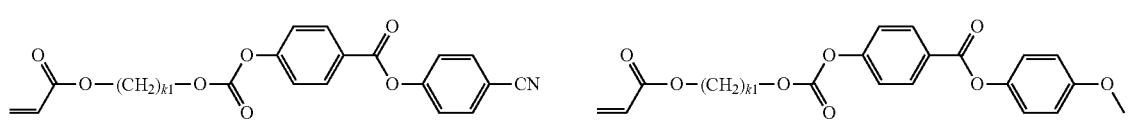
(VI-3) (VI-4)

-continued

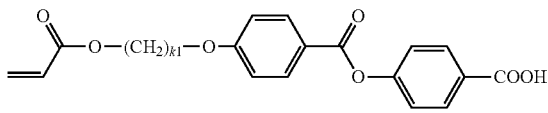

(VI-5)

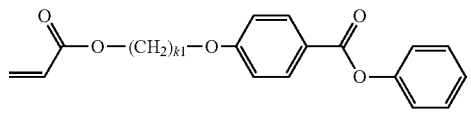

(VI-6)

The content of the liquid crystal compound in the composition for forming an optically anisotropic layer is generally from 5 to 50 parts by mass, and preferably from 10 to 30 parts by mass, relative to 100 parts by mass of the composition for forming an optically anisotropic layer.

<Solvent>

As a solvent, preferable is an organic solvent which can dissolve the components of the composition for forming an optically anisotropic layer such as the liquid crystal compound, and when the liquid crystal compound has a polymerizable group, more preferable is a solvent which can dissolve the components of the composition for forming an optically anisotropic layer such as the liquid crystal compound and which is inert to a polymerization reaction of the liquid crystal compound.

Specific examples thereof include alcohol solvents such as methanol, ethanol, ethylene glycol, isopropyl alcohol, propylene methyl cellosolve, butyl cellosolve, propylene glycol monomethyl ether and phenol; ester solvents such as ethyl acetate, butyl acetate, ethylene glycol methyl ether acetate, γ-butyrolactone, propylene glycol methyl ether acetate, ethyl lactate, butyl propionate, 2-methoxyethyl acetate, 2-ethoxyethyl acetate, isoamyl acetate, ethyl acetoacetate and ethyl 3-ethoxypropionate; ketone solvents such as acetone, methyl ethyl ketone, cyclopentanone, cyclohexanone, methyl amyl ketone, methyl isobutyl ketone and N-methyl-2-pyrrolidine; non-chlorinated aliphatic hydrocarbon solvents such as pentane, hexane and heptane; non-chlorinated aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to combine two or more of the solvents.

Preferable are alcohol solvents, ester solvents, ketone solvents, non-chlorinated aliphatic hydrocarbon solvents and non-chlorinated aromatic hydrocarbon solvents.

The content of the solvent is preferably from 10 to 10000 parts by mass, and more preferably from 100 to 5000 parts by mass, relative to 100 parts by mass of a solid content. The concentration of the solid content in the composition for forming an optically anisotropic layer is generally from 1 to 90% by mass, preferably from 2 to 50% by mass, and more preferably from 5 to 50% by mass. The "solid content" refers to the total of the components obtained by removing the solvent from the composition for forming an optically anisotropic layer.

The composition for forming an optically anisotropic layer may also comprise a polymerization initiator, a polymerization inhibitor, a photosensitizer, a leveling agent, a chiral agent, a reactive additive and the like, addition to the liquid crystal compound and solvent. When the liquid crystal compound has a polymerizable group, the composition for forming an optically anisotropic layer preferably has a polymerization initiator.

<Polymerization Initiator>

The polymerization initiator is preferably a photopolymerization initiator and preferably a photopolymerization initiator which generates a radical due to light radiation.

Examples of the photopolymerization initiator include a benzoin compound, a benzophenone compound, a benzyl ketal compound, an α-hydroxyketone compound, an α-aminoketone compound, an α-acetophenone compound, a triazine compound, an iodonium salt and a sulfonium salt. Specific examples thereof include Irgacure® 907, Irgacure® 184, Irgacure® 651, Irgacure® 819, Irgacure® 250, Irgacure® 369 (manufactured by Ciba Japan K.K.); SEIKUOL® BZ, SEIKUOL® Z, SEIKUOL® BEE (manufactured by Seiko Chemical Co., Ltd); Kayacure® BP100 (manufactured by Nippon Kayaku Co., Ltd.); Kayacure UVI-6992 (manufactured by Dow); Adekaoptomer® SP-152, Adekaoptomer® SP-170 (manufactured by ADEKA Corporation); TAZ-A, TAZ-PP (manufactured by Nihon Siber Hegner); and TAZ-104 (manufactured by SANWA Chemical). Among them, an α-acetophenone compound is preferable. Examples of the α-acetophenone compound include 2-methyl-2-morpholino-1-(4-methylsulfanilphenyl)propan-1-on, 2-dimethylamino-1-(4-morpholinophenyl)-2-benzylbutan-1-on and 2-dimethylamino-1-(4-morpholinophenyl)-2-(4-methylphenylmethyl)butan-1-on. The α-acetophenone compound is more preferably 2-methyl-2-morpholino-1-(4-methylsulfanilphenyl)propan-1-on or 2-dimethylamino-1-(4-morpholinophenyl)-2-benzylbutan-1-on. Examples of a commercially available product of the α-acetophenone compound include Irgacure® 369, 379EG and 907 (manufactured by BASF Japan), and also SEIKUOL® BEE (manufactured by Seiko Chemical Co., Ltd).

In order not to disturb an orientation of the liquid crystal compound, the content of the polymerization initiator is generally from 0.1 to 30 parts by mass, and preferably from 0.5 to 10 parts by mass, relative to 100 parts by mass of the liquid crystal compound.

<Polymerization Inhibitor>

Examples of the polymerization inhibitor include hydroquinone and hydroquinones having a substituent group such as alkyl ether group; catechols having an alkyl ether such as butyl catechol; a radical scavenger such as phyrogallols, 2,2,6,6-tetramethyl-1-piperidinyloxy radical; thiophenols; β-naphthylamines and β-naphthols.

In order not to disturb an orientation of the liquid crystal compound, the content of the polymerization inhibitor is generally from 0.1 to 30 parts by mass, and preferably from 0.5 to 10 parts by mass, relative to 100 parts by mass of the liquid crystal compound.

<Photosensitizer>

Examples of the photosensitizer include xanthones such as xanthone and thioxanthone; anthracene and anthracenes having a substituent group such as alkyl ether group; phenothiazine; and rubrene.

By using the photosensitizer, it is possible to make the photopolymerization initiator highly sensitive. The content of the photosensitizer is generally from 0.1 to 30 parts by mass, and preferably from 0.5 to 10 parts by mass, relative to 100 parts by mass of the liquid crystal compound.

<Leveling Agent>

Examples of the leveling agent include organically modified silicone oil-based leveling agents, polyacrylate-based leveling agents and perfluoroalkyl-based leveling agents. Specific examples thereof include DC3PA, SH7PA, DC11PA, SH28PA, SH29PA, SH30PA, ST80PA, ST86PA, SH8400, SH8700 and FZ2123 (manufactured by Dow Corning Toray Co., Ltd.); KP321, KP323, KP324, KP326, KP340, KP341, X22-161A and KF6001 (manufactured by Shin-Etsu Chemical Co., Ltd.); TSF400, TSF401, TSF410, TSF4300, TSF4440, TSF4445, TSF-4446, TSF4452 and TSF4460 (manufactured by Momentive Performance Materials Japan LLC); Fluoriner® FC-72, FC-40 and FC-3283 (manufactured by Sumitomo 3M Limited); Megafac® R-08, R-30, R-90, F-410, F-411, F-443, F-445, F-470, F-477, F-479, F-482 and F-483 (manufactured by DIC Corporation); F Top (product name) EF301, EF303, EF351 and EF352 (manufactured by Mitsubishi Materials Electronic Chemicals Co., Ltd.); Surflon® S-381, S-382, S-383, S-393, SC-101, SC-105, KH-40 and SA-100 (manufactured by AGC SEIMI CHEMICAL CO., LTD); product names E1830 and E5844 (manufactured by Daikin Fine Chemical Laboratory, Co., Ltd.); and BM-1000, BM-1100, BYK-352, BYK-353 and BYK-361N (product names, manufactured by BM Chemie). It is also possible to combine two or more kinds of the leveling agents.

By using the leveling agent, it is possible to form a smoother optically anisotropic layer. In addition, it is possible to control a flowability of the composition for forming an optically anisotropic layer in the course of production of an optically anisotropic layer. The content of the leveling agent is generally from 0.1 to 30 parts by mass, and preferably from 0.1 to 10 parts by mass, relative to 100 parts by mass of the liquid crystal compound.

<Chiral Agent>

Examples of the chiral agent include known chiral agents (for example, described in "Liquid crystal handbook", Chapter 3, Section 4-3, Chiral agent for TN and STN, page 199, edit: Japan Society for the Promotion of Science, 142 committee, 1989).

Although a chiral agent generally comprises an asymmetric carbon atom, it is also possible to use an axially asymmetric compound or a planarly asymmetric compound, which have no asymmetric carbon atom, as the chiral agent. Examples of the axially asymmetric compound and the planarly asymmetric compound include binaphthyl, helicene, paracyclophane and the derivatives thereof.

Specific examples of the chiral agent include compounds described in JP 2007-269640 A, JP 2007-269639 A, JP 2007-176870 A, JP 2003-137887 A, JP 2000-515496 A, JP 2007-169178 A and JP 09-506088 A, and the chiral agent is preferably Paliocolor® LC756 manufactured by BASF Japan.

In order not to disturb an orientation of the liquid crystal compound, the content of the chiral agent is generally from 0.1 to 30 parts by mass, and preferably from 1.0 to 25 parts by mass, relative to 100 parts by mass of the liquid crystal compound.

<Reactive Additive>

The reactive additive preferably has a carbon-carbon unsaturated bond and an active hydrogen reactive group in the molecule. The "active hydrogen reactive group" refers to a group reactive to a group having an active hydrogen such as a carboxyl group (—COOH), a hydroxyl group (—OH), an amino group (—NH$_2$), and typical examples thereof include an epoxy group, an oxazoline group, a carbodiimide group, an aziridine group, an imide group, an isocyanate group, a thioisocyanate group and a maleic anhydride group.

In the reactive additive, at least two active hydrogen reactive groups preferably exist, and in this case, the multiple active hydrogen reactive groups may be also identical to or independently different from one another.

The carbon-carbon unsaturated bond contained in the reactive additive may be also a carbon-carbon double bond, a carbon-carbon triple bond or the combination thereof, and is preferably a carbon-carbon double bond. Among them, the reactive additive preferably comprises a vinyl group and/or a (meth)acryl group. Furthermore, the active hydrogen reactive group is preferably selected from at least one of the group consisting of an epoxy group, a glycidy group and an isocyanate group, and is particularly preferably a reactive additive having an acryl group and an isocyanate group.

Specific examples of the reactive additive include a compound having a (meth)acryl group and an epoxy group, such as methacryloxy glycidy ether and acryloxy glycidy ether; a compound having a (meth)acryl group and an oxetane group, such as oxetane acrylate and oxetane methacrylate; a compound having a (meth)acryl group and a lactone group, such as lactone acrylate and lactone methacrylate; a compound having a vinyl group and an oxazoline group, such as vinyl oxazoline and isopropenyl oxazoline; an oligomer of compound having a (meth)acryl group and an isocyanate group such as isocyanatomethyl acrylate, isocyanatomethyl methacrylate, 2-isocyanatoethyl acrylate and 2-isocyanatoethyl methacrylate. In addition, examples thereof include a compound having a vinyl group or a vinylene group and an anhydride, such as methacrylic anhydride, acrylic anhydride, maleic anhydride and vinyl maleic anhydride. Among them, preferable are methacryloxy glycidy ether, acryloxy glycidy ether, isocyanatomethyl acrylate, isocyanatomethyl methacrylate, vinyl oxazoline, 2-isocyanatoethyl acrylate, 2-isocyanatoethyl methacrylate, and the above-mentioned oligomers, and particularly preferable are isocyanatomethyl acrylate, 2-isocyanatoethyl acrylate and the above-mentioned oligomer.

Preferable reactive additive is represented by the following formula (Y):

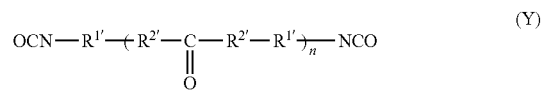

wherein n represents an integer from 1 to 10, $R^{1'}$ represents a divalent aliphatic or alicyclic hydrocarbon group having 2 to 20 carbon atoms, or a divalent aromatic hydrocarbon group having 5 to 20 carbon atoms, in two $R^{2'}$ contained in each repeating unit, one represents —NH—, and the other represents a group represented by >N—C(=O)—$R^{3'}$, wherein $R^{3'}$ represents a hydroxyl group or a group having a carbon-carbon unsaturated bond, and in case that n is 2 or more, at least one of $R^{3'}$ in multiple groups >N—C(=O)—$R^{3'}$ is preferably a group having a carbon-carbon unsaturated bond.

Among the reactive additives represented by the formula (Y), particularly preferable is a compound represented by the following formula (YY) (hereinafter, also referred to as "compound (YY)"):

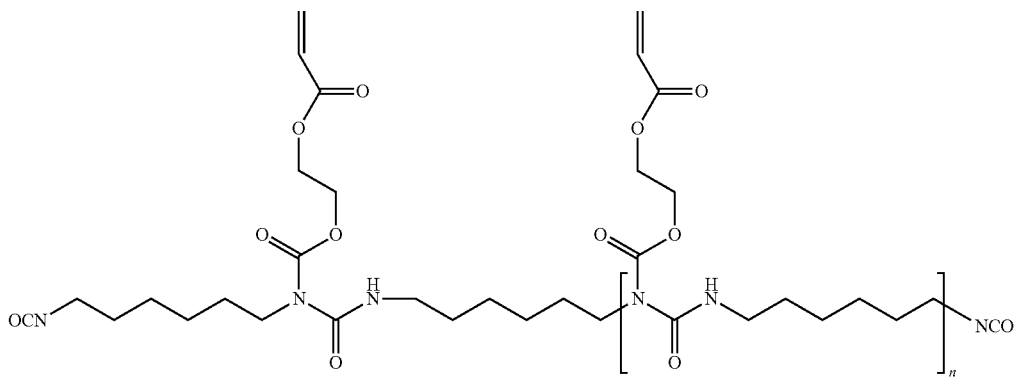

(YY)

wherein n is defined in the same manner as mentioned above.

As compound (YY), a commercially available product can be used directly or optionally after purified. Examples of the commercially available product include Laromer® LR-9000 (manufactured by BASF).

The content of the reactive additive is generally from 0.1 to 30 parts by mass, and preferably from 0.1 to 5 parts by mass, relative to 100 parts by mass of the liquid crystal compound.

Examples of a method for applying the composition for forming an optically anisotropic layer onto an elongated film roll or a coating formed on an elongated film roll include the methods described above for the orientation film.

Examples of a drying method include air drying method, draught drying method, heat drying method and vacuum drying method. Preferable is a combination method of draught drying method and heat drying method. The drying temperature is preferably from 10 to 250° C., and further preferably from 25 to 200° C. The drying time preferably from 10 seconds to 60 minutes, and more preferably from 30 seconds to 30 minutes. A solvent contained in the composition for forming an optically anisotropic layer is removed by drying.

The liquid crystal compound contained in the applied composition for forming an optically anisotropic layer is generally oriented by heat-drying the applied composition for forming an optically anisotropic layer and removing a solvent to change it into a liquid crystal phase.

The oriented liquid crystal compound may be also used directly as an optically anisotropic layer. However, when the liquid crystal compound has a polymerizable group, it is preferable to polymerize and cure the liquid crystal compound. An optically anisotropic layer obtained by polymerization of the liquid crystal compound is insulated from the influence of the change of the birefringence due to heat, since the orientation of the liquid crystal compound is fixed.

A method for polymerizing the liquid crystal compound having a polymerizable group is preferably a photopolymerization method. Since it is possible to carry out a polymerization at a low temperature according to the photopolymerization method, the range of choice for a resin elongated film roll to be used is expanded in terms of heat resistance. A photopolymerization reaction is generally carried out by radiating a visible light, an ultraviolet light or a laser light, preferably an ultraviolet light.

The time to radiate a light is generally from 5 seconds to 10 minutes, preferably from 5 seconds to 2 minutes, more preferably from 5 seconds to 1 minute, and further preferably from 5 seconds to 30 seconds. When the time is within the above range, an optically anisotropic layer having superior transparency can be obtained.

The thickness of the optically anisotropic layer is preferably from 0.1 µm to 10 µm, and in view of reduction photoelasticity, further preferably from 0.2 µm to 5 µm.

<Protective Layer>

The protective layer is generally formed from a composition for forming a protective layer comprising a water-soluble polymer and a solvent, and examples of the water-soluble polymer include an acryl-based oligomer and polymer made of a polyfunctional acrylate (methacrylate), an urethane acrylate, a polyester acrylate, an epoxy acrylate or the like; a polyvinyl alcohol; an ethylene-vinyl alcohol copolymer; polyvinyl pyrolidone; starches; methylcellulose; carboxy methylcellulose; and sodium alginate. The composition for forming a protective layer is one of the compositions for an optically anisotropic film component.

Examples of a solvent contained in the composition for forming a protective layer include the solvents described above. Among them, at least one solvent selected from the group consisting of water, alcohol solvents and ether solvents is preferable in view that they do not dissolve a layer forming the protective layer. Examples of alcohol solvents include methanol, ethanol, butanol, ethylene glycol, isopropyl alcohol, propylene glycol, ethylene glycol methyl ether, ethylene glycol butyl ether and propylene glycol monomethyl ether. Examples of ether solvents include ethylene glycol monomethyl ether acetate and propylene glycol monomethyl ether acetate. Among them, isopropyl alcohol, Propylene glycol monomethyl ether and propyleneglycol monomethyl ether acetate are preferable.

Examples of methods for applying and drying of the composition for forming a protective layer include the methods described above for the orientation film.

The thickness of the protective layer is generally 20 µm or less. The thickness of the protective layer is preferably from 0.5 µm to 10 µm, and more preferably from 1 µm to 5 µm. The thickness of the protective layer can be generally determined according to a measurement by means of an interactive film thickness meter, a laser microscope or a contact-type thickness meter.

<Adhesive Agent Layer>

The adhesive agent layer is generally formed from an adhesive agent composition comprising an adhesive mass, an adhesive agent or an active energy ray-curable adhesive agent. The adhesive agent composition is one of the compositions for an optically anisotropic film component.

Examples of the adhesive mass include a polymer made of a monomer having an ethylenically unsaturated group and having a glass transition temperature (Tg) of 20° C. or lower. Tg can be arbitrarily adjusted by a polymerization condition such as a monomer ratio.

Examples of the monomer having an ethylenically unsaturated group include a monomer having a (meth)acryloyl group, a monomer having a vinyl group, and olefin hydrocarbon.

The polymer made of the monomer having an ethylenically unsaturated group contained in the adhesive mass can be produced by known methods such as solution polymerization method, emulsion polymerization method, mass polymerization method and suspension polymerization method.

Examples of the adhesive agent include a polymer made of a monomer having a protonically functional group, such as a hydroxyl group, a carboxy group and amino group, and an ethylenically unsaturated group; and a composition mainly comprising an urethane resin and additionally comprising a crosslinking agent or a curable compound, such as a polyfunctional aldehyde, an epoxy compound, an epoxy resin, a melamine compound, a zirconia compound and a zinc compound.

The active energy ray-curable adhesive agent is an adhesive agent which is cured by radiation of an active energy ray.

Examples of the active energy ray-curable adhesive agent include an cationically polymerizable active energy ray-curable adhesive agent comprising an epoxy compound and a cationic polymerization initiator; a radically polymerizable active energy ray-curable adhesive agent comprising an acryl-based curable component and a radical polymerization initiator; an active energy ray-curable adhesive agent comprising both a cationically polymerizable curable component and a radically polymerizable curable component such as an acryl-based compound and additionally comprising a cationic polymerization initiator and a radical polymerization initiator; and an active energy ray-curable adhesive agent which comprises no polymerization initiator and is cured by radiation of electron beam. Among them, the cationically polymerizable active energy ray-curable adhesive agent comprising an epoxy compound and a cationic polymerization initiator is preferable. Such an adhesive agent is preferable since it can be used substantially without a solvent.

In the present invention, the active energy ray is defined as an energy ray which can decompose a compound, which will generate an active species, to generate the active species. Example of the active energy ray include visible light, ultraviolet light, infrared light, X-ray, α-ray, β-ray, γ-ray and electron beam. Ultraviolet light or electron beam is generally used to the active energy ray-curable adhesive agent in the present invention.

Examples of methods for applying and drying the adhesive agent composition include the methods described above for the orientation film.

<Conveying>

The conveyance direction of the elongated film roll on which the coating has been formed can be changed while air is continuously blown to a surface of the coating of the elongated film roll on which the coating has been formed. Preferably, the conveyance direction of the elongated film roll is changed while the surface, on which the coating has been formed, is brought into contact with nothing but air (gas), and the conveyance direction is changed to a side of the surface on which the coating has been formed.

When the elongated film roll is conveyed, a guide roll is generally used in order to maintain its tension. However, a defect generates in the coating by contact of the guide roll with the surface of the coating, and the defect leads to orientation disturbance of the liquid crystal compound, and as a result, the performance of the optically anisotropic layer may decrease.

By changing the conveyance direction of the elongated film roll while blowing air continuously to the surface of the coating formed on the elongated film roll, it is possible to convey the elongated film roll while maintaining its tension.

The conveyance direction to be changed while blowing air continuously is generally from 5° to 220°, preferably from 20° to 180°, and more preferably from 45° to 130°.

Provided that the surface of the coating is an upper layer and the surface of the elongated film roll is a lower layer, the degree of the angle refers to a difference of the degree when the conveyance direction is changed to the side of the upper layer. That is, when a conveyance direction before change of the conveyance direction is a basis (0°), the degree of the angle refers to the degree of a conveyance direction after change of the conveyance direction.

The tension in conveying the elongated film roll is preferably from 50 to 150 N/mm, more preferably from 60 to 130 N/mm and further preferably from 70 to 120 N/mm.

The conveying speed of the elongated film roll is preferably from 3 to 20 m/min.

Examples of a method for changing the conveyance direction of the elongated film roll while blowing air continuously include a method of using an air blow guiding member. When the conveyance direction of the elongated film roll is changed with an air blow guiding member, there is a clearance between the air blow guiding member and the coating formed on the elongated film roll.

The clearance between the air blow guiding member and the coating is generally from 0.01 to 10 mm and preferably from 0.1 to 5 mm.

Figure 2:
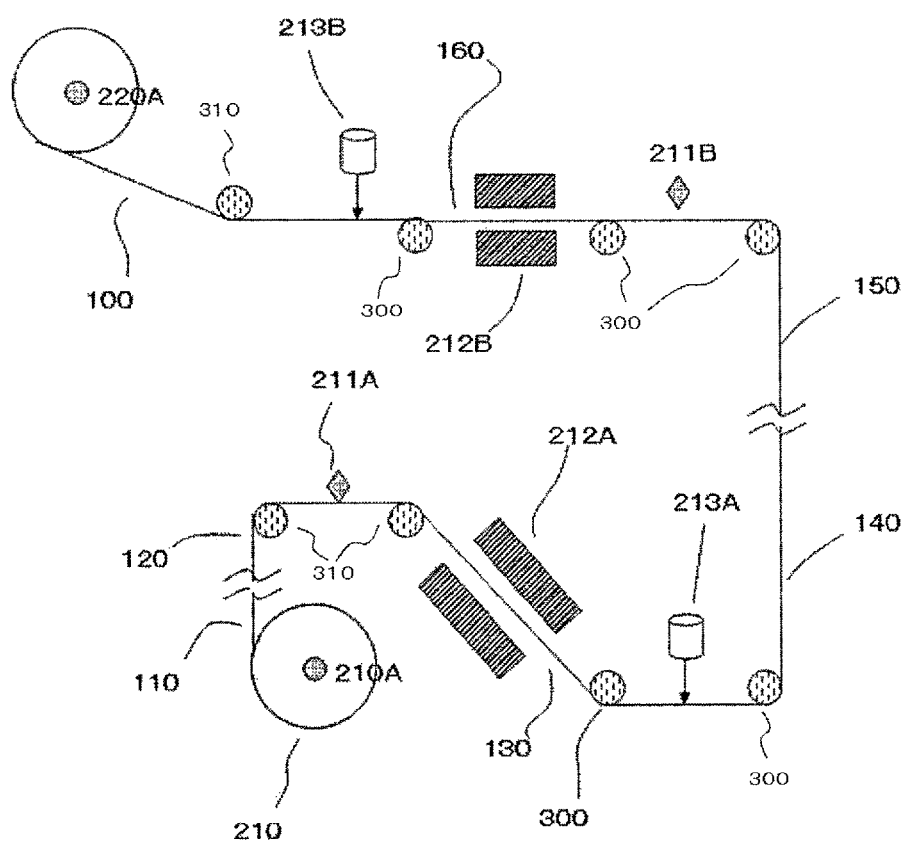
FIG. 2 is a diagram showing a main part of the continuous production process an optically anisotropic film component.

Examples of the air blow guiding member include an air turn bar described in FIG. 2 of WO 2013/105317. According to the air turn bar, it is possible to blow air having a pressure depending on surface area of a substrate, to change the conveyance direction in no contact, and to provide a tension. Thus, when a substrate is conveyed with the air turn bar, the air speed is adjusted depending on the conveying speed and a width of the conveyed substrate.

An optically anisotropic film component produced by the present production process (hereinafter, also referred to as "the present component") is obtained.

Examples of the present component include components having the following constitutions in these orders:

Elongated film roll, Orientation film

Elongated film roll, Optically anisotropic layer

Elongated film roll, Orientation film, Optically anisotropic layer

Elongated film roll, Orientation film, Optically anisotropic layer, Protective layer Elongated film roll, Orientation film, Optically anisotropic layer, Adhesive agent layer Elongated film roll, Orientation film, Optically anisotropic layer, Protective layer, Orientation film Elongated film roll, Orientation film, Optically anisotropic layer, Protective layer, Orientation film, Optically anisotropic layer Orientation film, Elongated film roll, Orientation film Optically anisotropic layer, Elongated film roll, Optically anisotropic layer Optically anisotropic layer, Orientation film, Elongated film roll, Orientation film, Optically anisotropic layer.

It is preferable that the coatings in the present components are continuously formed.

Hereinafter, the present production process for obtaining an optically anisotropic film component having a constitution of "Elongated film roll, Orientation film, Optically anisotropic layer" will be described.

An elongated film roll is wound off from first roll 210. The elongated film roll is wound off by arranging a suitable rotary means at core 210A of first roll 210 and rotating first roll 210 by the rotary means. Alternatively, a suitable guide roll 310 may be arranged in a conveyance direction of the elongated film roll from first roll 210 in order to wind off the elongated film roll by a rotary means of guide roll 310. Furthermore, by arranging a rotary means together with first core 210A and guide roll 310, the elongated substrate may be wound off while providing the elongated film roll with a suitable tension.

On a surface of the elongated film roll wound off from first roll 210, a composition for forming a photo-orientation film is applied by means of application device 211A, when the elongated film roll passes through application device 211A. After that, while the surface applied with the composition for forming a photo-orientation film is not brought into contact with guide roll 310, the conveyance direction can be changed by means of air blow guiding member 300.

The elongated film roll which has passed through application device 211A is conveyed to drying furnace 212A, and a solvent is removed in drying furnace 212A. Drying furnace 212A may comprise multiple zones having different preset temperatures, or may comprise multiple drying furnaces having different preset temperatures and arranged in series.

An orientation film is formed by radiation of a polarization light by means of light radiating device 213A after drying.

Subsequently, the elongated film roll, on which the orientation film is formed, passes through application device 211B. A composition for forming an optically anisotropic layer is applied on the orientation film by means of application device 211B. Then, a solvent is removed by passing through drying furnace 212E. As is the case in drying furnace 212A, drying furnace 212B may comprise multiple zones having different preset temperatures, or comprise multiple drying furnaces having different preset temperatures and arranged in series.

By passing through drying furnace 212E, the liquid crystal compound contained in the composition for forming an optically anisotropic layer is oriented. Light radiating device 213E radiates a light in a condition that the liquid crystal compound is oriented, and as a result, the liquid crystal compound is polymerized while the orientation is maintained, and an optically anisotropic layer is formed. The liquid crystal compound here has a polymerizable group.

The optically anisotropic film component obtained thus is wound up on second core 220A to obtain second roll 220. In winding it up, it may be wound up along with a suitable spacer.

Thus, the elongated film roll passes from first roll 210 through application device 211A, drying furnace 212A, light radiating device 213A, application device 211B, drying furnace 212B and light radiating device 213B in this order, and the conveyance direction is changed while air is continuously blown to the surface on which the coating has been formed. As a result, an optically anisotropic film component can be continuously produced while a tension of the elongated film roll is maintained.

In FIG. 1, for example, an elongated film roll passes from first roll 210 through application device 211A, drying furnace 212A and light radiating device 213A in this order, and this is wound up on a core, and as a result, an optically anisotropic film component on which an orientation film is formed can be obtained. In addition, the optically anisotropic film component, which has been wound up on the core, may be wound off and passed through application device 211B, drying furnace 212B and light radiating device 213B in this order to form an optically anisotropic layer.

In order to obtain an optically anisotropic layer having fewer defects, as described in FIG. 1, it is preferable to continuously carry out formation of the orientation film and formation of the optically anisotropic layer.

Hereinafter, the present production process for obtaining the optically anisotropic film component having a constitution of "Optically anisotropic layer, Orientation film, Elongated film roll, Orientation film, Optically anisotropic layer" will be described by reference to FIG. 2. Details as to formation of an orientation film are omitted.

First roll 210 in which the elongated film roll has been wound up is prepared. Elongated film roll 110 is continuously wound off from first roll 210, and an orientation film (which is no described in the figure) is formed on one side of the elongated film roll to obtain elongated film roll 120 on one side of which an orientation film is formed. After that, while the surface on which the orientation film is formed is not brought into contact with guide roll 310, the conveyance direction can be changed by means of air blow guiding member 300.

Subsequently, a composition for forming an optically anisotropic layer is applied on the formed orientation film by means of application device 211A. By passing through drying furnace 212A, a solvent is removed from the applied composition for forming an optically anisotropic layer. In addition, by carrying out a light radiation by means of light radiating device 213A, optically anisotropic film component 140 is obtained in which the elongated film roll, the orientation film and the optically anisotropic layer are layered in this order.

An orientation film (which is not described in the figure) is formed on a surface reverse to the surface of optically anisotropic film component 140, on which the optically anisotropic layer is formed, to obtain elongated film roll 150 on which the orientation film is formed.

A composition for forming an optically anisotropic layer is applied on the orientation film of the obtained elongated film roll 150 by means of application device 211B, a solvent is removed by means of drying furnace 212B, and a light is radiated by light radiating device 2131B. As a result, an optically anisotropic layer is formed.

The obtained optically anisotropic film component 100 is wound up on second core 220A. In winding it up, it may be wound up along with a suitable spacer.

Figure 3:
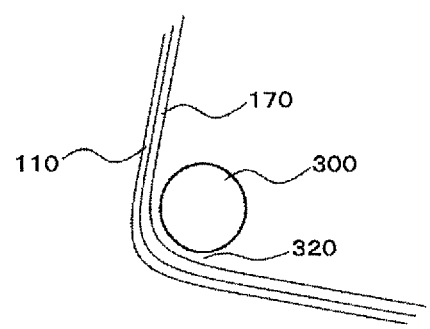
FIG. 3 is a diagram showing an elongated film roll on which a coating has been formed and an air blow guiding member in conveying the elongated film roll on which the coating has been formed.

FIG. 3 is a diagram of an elongated film roll on which a coating has been formed, and an air blow guiding member when conveying the elongated film roll on which the coating has been formed. A conveyance direction of elongated film roll 110, on which coating 170 has been formed, is changed in no contact with air blow guiding member 300, while blowing air continuously from air blow guiding member 300. There is clearance 320 between coating 170 and air blow guiding member 300.

The present component having an optically anisotropic layer can be used as an optically anisotropic film. A number of the optically anisotropic film may be layered, or the optically anisotropic film may be combined with another film. When a number of the optically anisotropic film are layered or when the optically anisotropic film may be combined with another film, it is possible to use it as a viewing angle compensation film, a viewing angle expansion film, an antireflection film, a polarization plate, a circular polarization plate, an elliptical polarization plate or a luminance-improving film.

The present component having an optically anisotropic layer may be optionally cut and used in different display devices. The display devices are devices having a display element, and comprise a luminescent element or device as a luminescent source. Examples of the display device include a liquid crystal display device, an organic electroluminescence (EL) display device, an inorganic electroluminescence (EL) display device, an electron emission display device (such as a field emission display device (FED) and surface-conduction electron-emitter display (SED)), an electronic paper (a display device with an electronic ink or an electrophoresis element, a plasma display device, a projection type-display device (such as a grating light valve (GLV) display device, a display device having a digital micromirror device (DMD)) and a piezoceramic display. The liquid crystal display device may be a transmissive liquid crystal display, a semi-transmissive liquid crystal display, a reflective liquid crystal display, a direct viewing liquid crystal display or a projection liquid crystal display. These display devices may be also display devices displaying a two-dimensional image or stereoscopic display devices displaying a three-dimensional image. The optically anisotropic film is particularly suitable for compensation of a liquid crystal device of IPS (in-plane switching) mode.

EXAMPLES

Hereinafter, the present invention will be described in more detail by examples. "%" and "part(s)" in the examples refer to % by mass and part(s) by mass, unless otherwise described.

TABLE 1

|  | Anisotropic polymer SUNEVER SE-610 | N-methyl-2-pyrolidone | 2-butoxy-ethanol | Ethyl cyclohexane |
|---|---|---|---|---|
| Anisotropic polymer composition (1) | 0.5% | 72.0% | 18.4% | 9.1% |

The values in Table 1 represent content ratios of each component relative to the total of the prepared composition. As to SE-610, the solid content was converted from the concentration described in the delivered specification.

[Preparation of Composition for Forming Optically Anisotropic Layer]

A formulation of a composition for forming an optically anisotropic layer is shown in Table 2. The components were mixed, and the resulting solution was stirred at 80° C. for one hour and then cooled to room temperature to obtain composition for forming optically anisotropic layer (1).

TABLE 2

|  | Polymerizable liquid crystal compound | Photopolymerization initiator | Leveling agent | Additive | Solvent |
|---|---|---|---|---|---|
| Composition for forming optically anisotropic layer (1) | LC242 (19.2%) | Irg907 (0.5%) | BYK-361N (0.1%) | LR9000 (1.1%) | PGMEA (79.1%) |

The values in the brackets in Table 2 represent content ratios of each component relative to the total of the prepared composition.

In Table 2, LR-9000 represents Laromer® LR-9000 manufactured by BASF, Irg907 represents Irgacure® 907 manufactured by BASF Japan, BYK361N represents a leveling agent manufactured by BYK Japan KK, LC242 represents a liquid crystal compound represented by the following formula, and PGMEA represents propylene glycol 1-monomethyl ether 2-acetate.

LC242

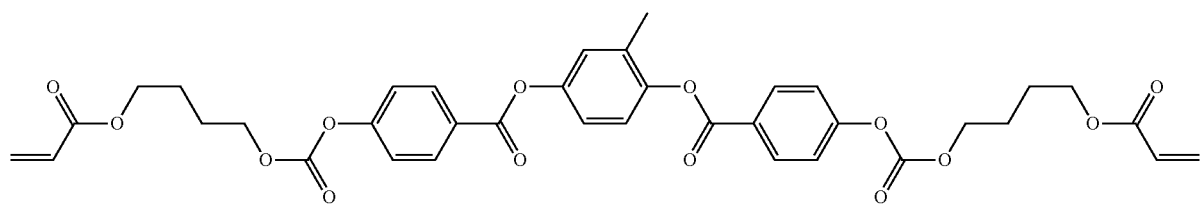

[Preparation of Anisotropic Polymer Composition]

A formulation of an anisotropic polymer composition is shown in Table 1. N-methyl-2-pyrolidone, 2-butoxyethanol and ethyl cyclohexane were added to SUNEVER SE-610 (manufactured by NISSAN CHEMICAL INDUSTRIES, LTD.), which is a commercially available anisotropic polymer, to obtain anisotropic polymer composition (1).

Example 1

Plasma was generated in a condition of 1.3 kV under an atmosphere of nitrogen and oxygen (volume ratio: nitrogen/oxygen=99.9/0.1) by means of a normal pressure plasma surface treatment device (roll direct head type, AP-T04S-

R890, manufactured by Sekisui Chemical CO., LTD.), and a surface of 100 m of a roll-shaped cycloolefin polymer film (ZF-14, manufactured by Zeon Corporation) was treated. The tensions of winding up and off the roll-shaped cycloolefin polymer film were set at 70 N/mm. Anisotropic polymer composition (1) was applied on the plasma-treated surface of the cycloolefin polymer film by means of a die coater, conveyed to a drying furnace at 90° C. and dried for 1 minute to obtain orientation film (1). The conveyance direction of the roll-shaped cycloolefin polymer film, on which orientation film (1) was formed, was changed by 90° while air is continuously blown to the surface of orientation film (1) using an air blow guiding member. The clearance between orientation film (1) and the air blow guiding member was approximately 1 mm. Subsequently, composition for forming an optically anisotropic layer (1) was applied on the surface of the obtained orientation film (1) by means of a die coater, conveyed to a drying furnace at 80° C. and dried for 1 minute, and an ultraviolet light was radiated at a wavelength of 365 nm and an illumination intensity of 160 W/cm by means of a high-pressure mercury lamp (manufactured by GS Yuasa Corporation) to obtain optically anisotropic layer (1). The cycloolefin polymer film, on which the orientation film and the optically anisotropic layer were formed, was wound up to obtain roll-shaped optically anisotropic film component (1).

Reference Example 1

Plasma was generated in a condition of 1.3 kV under an atmosphere of nitrogen and oxygen (volume ratio: nitrogen/oxygen=99.9/0.1) by means of a normal pressure plasma surface treatment device (roll direct head type, AP-T04S-R890, manufactured by Sekisui Chemical CO., LTD.), and a surface of 100 m of a roll-shaped cycloolefin polymer film (ZF-14, manufactured by Zeon Corporation) was treated. The tensions of winding up and off the roll-shaped cycloolefin polymer film were set at 70 N/mm. Anisotropic polymer composition (1) was applied on the plasma-treated surface of the cycloolefin polymer film by means of a die coater, conveyed to a drying furnace at 90° C. and dried for 1 minute to obtain orientation film (2). The conveyance direction of the roll-shaped cycloolefin polymer film, on which orientation film (2) was formed, was changed by 90° using a conventional guide roll. Orientation film (2) came into contact with the conventional guide roll. Subsequently, composition for forming an optically anisotropic layer (1) was applied on the surface of the obtained orientation film (2) by means of a die coater, conveyed to a drying furnace at 20° C. and dried for 1 minute, and an ultraviolet light was radiated at a wavelength of 365 nm and an illumination intensity of 160 W/cm by means of a high-pressure mercury lamp (manufactured by GS Yuasa Corporation) to obtain optically anisotropic layer (2). The cycloolefin polymer film, on which the orientation film and the optically anisotropic layer were formed, was wound up to obtain roll-shaped optically anisotropic film component (2).

[Measurement of Defect Number]

Optically anisotropic film component (1) and (2) were put in crossed Nicol and observed with a CCD camera in a range of 8 m$^2$, and a number of a defect having a dimension of 30 μm or more per 1 m$^2$ of optically anisotropic film components (1) and (2) was counted. The result is shown in Table 3.

[Measurement of Optical Properties]

The retardation values of optically anisotropic layers (1) and (2) were measured by means of a measuring apparatus (KOBRA-WR, manufactured by Oji Scientific Instruments). In the measurement, incident angles of the light were changed to observe the orientation condition of the liquid crystal compound contained in optically anisotropic layers (1) and (2). The result is shown in Table 3.

TABLE 3

| | Defect number/m$^2$ | Orientation |
|---|---|---|
| Optically anisotropic layer (1) | 8 | Vertical orientation |
| Optically anisotropic layer (2) | 10 | Vertical orientation |

Optically anisotropic layer (1) produced in Example has reduced defects in comparison with optically anisotropic layer (2) produced in Reference example.

According to the present invention, it is possible to produce an optically anisotropic film component having few defects.

DESCRIPTION OF SYMBOLS

110: Elongated film roll
170: Coating
210: First roll
210A: Core
220: Second roll
220A: Core
211A, 211B: Application device
212A, 212B: Drying furnace
213A, 213B: Light radiating device
300: Air blow guiding member
310: Guide roll
320: Clearance

The invention claimed is:

1. A process for producing an optically anisotropic film component, the process comprising:
    forming a coating continuously on a surface of an elongated film; and
    changing a conveyance direction of the elongated film on which the coating has been formed while blowing air continuously to a surface of the coating formed on the elongated film, an angle of the conveyance direction to be changed being 20° to 180°,
    wherein, provided that the surface of the coating is an upper layer and the surface of the elongated film is a lower layer, the degree of the angle refers to a difference of the degree when the conveyance direction is changed to a side of the upper layer, and
    wherein the tension in conveying the elongated film is from 60 to 130 N/mm.

2. The process for producing an optically anisotropic film component according to claim 1, wherein the following steps (1) and (2) are carried out:
    step (1) of applying a composition for an optically anisotropic film component onto the elongated film, and
    step (2) of forming the coating from the applied composition for an optically anisotropic film component.

3. The process for producing an optically anisotropic film component according to claim 1, wherein the composition for an optically anisotropic film component is a composition for forming an orientation film, and the coating is an orientation film.

4. The process for producing an optically anisotropic film component according to claim 1, wherein the composition for an optically anisotropic film component is a composition for forming an optically anisotropic layer, and the coating is an optically anisotropic layer.

5. The process for producing an optically anisotropic film component according to claim 1, wherein the following steps (11) to (14) are carried out:
step (11) of applying a first composition for an optically anisotropic film component onto the elongated film,
step (12) of forming a first coating from the applied first composition for an optically anisotropic film component,
step (13) of applying a second composition for an optically anisotropic film component onto the first coating, and
step (14) of forming a second coating from the applied second composition for an optically anisotropic film component.

6. The process for producing an optically anisotropic film component according to claim 5, wherein the first composition for an optically anisotropic film component is a composition for forming an orientation film, the first coating is an orientation film, the second composition for an optically anisotropic film component is a composition for forming an optically anisotropic layer, and the second coating is an optically anisotropic layer.

7. The process for producing an optically anisotropic film component according to claim 1, wherein air is blown with an air blow guiding member.

8. An optically anisotropic film obtained by the process for producing an optically anisotropic film component according to claim 1.

9. A liquid crystal display device comprising the optically anisotropic film according to claim 8.

10. A process for producing an optically anisotropic film component, the process comprising:
forming a coating continuously on a surface of an elongated film; and
changing a conveyance direction of the elongated film on which the coating has been formed while blowing air continuously to a surface of the coating formed on the elongated film, an angle of the conveyance direction to be changed being 20° to 180°,
wherein, provided that the surface of the coating is an upper layer and the surface of the elongated film is a lower layer, the degree of the angle refers to a difference of the degree when the conveyance direction is changed to a side of the upper layer;
wherein the forming of a coating is conducted by carrying out the following steps (11) to (14):
step (11) of applying a first composition for an optically anisotropic film component onto the elongated film,
step (12) of forming a first coating from the applied first composition for an optically anisotropic film component,
step (13) of applying a second composition for an optically anisotropic film component onto the first coating, and
step (14) of forming a second coating from the applied second composition for an optically anisotropic film component,
wherein the first composition for an optically anisotropic film component is a composition for forming an orientation film, the first coating is the orientation film, the second composition for an optically anisotropic film component is a composition for forming an optically anisotropic layer, the second coating is the optically anisotropic layer,
wherein the composition for forming an optically anisotropic layer comprises a liquid crystal compound having a group represented by formula (X):

$$P^{11}\text{—}B^{11}\text{-}E^{11}\text{-}B^{12}\text{-}A^{11}\text{-}B^{13}\text{—} \qquad (X)$$

wherein:
$P^{11}$ represents a hydrogen atom or a polymerizable group,
$A^{11}$ represents a divalent alicyclic hydrocarbon group or a divalent aromatic hydrocarbon group, wherein a hydrogen atom of the divalent alicyclic hydrocarbon group and of the divalent aromatic hydrocarbon group may be substituted with a halogen atom, an alkyl group having 1 to 6 carbon atoms, an alkoxy group having 1 to 6 carbon atoms, a cyano group or a nitro group, and wherein a hydrogen atom of the alkyl group having 1 to 6 carbon atoms and of the alkoxy group having 1 to 6 carbon atoms may be substituted with a fluorine atom,
$B^{11}$ represents —O—, —S—, —CO—O—, —O—CO—, —O—CO—O—, —CO—NR$^{16}$—, —NR$^{16}$—CO—, —CO—, —CO—, —CS— or a single bond, wherein R$^{16}$ represents a hydrogen atom or an alkyl group having 1 to 6 carbon atoms,
$B^{12}$ and $B^{13}$ each independently represent —CH=CH—, —CH$_2$—CH$_2$—, —O—, —S—, —C(=O)—, —C(=O)—O—, —O—C(=O)—, —O—C(=O)—O—, —CH=N—, —N=CH—, —N=N—, —C(=O)—NR$^{16}$—, —NR$^{16}$—C(=O)—, —OCH$_2$—, —OCF$_2$—, —CH$_2$O—, —CF$_2$O—, —CH=CH—C(=O)—O—, —O—C(=O)—CH=CH— or a single bond, and
$E^{11}$ represents an alkanediyl group having 1 to 12 carbon atoms, wherein a hydrogen atom contained in the alkanediyl group may be also substituted with an alkoxy group having 1 to 5 carbon atoms, a hydrogen atom of the alkoxy group may be also substituted with a halogen atom, and —CH$_2$-constituting the alkanediyl group may be also substituted with —O— or —CO—.

* * * * *